US008766493B2

(12) United States Patent
Hunter et al.

(10) Patent No.: US 8,766,493 B2
(45) Date of Patent: Jul. 1, 2014

(54) MAGNETIC STATOR ASSEMBLY

(75) Inventors: Ian W. Hunter, Lincoln, MA (US); Timothy A. Fofonoff, Cambridge, MA (US)

(73) Assignee: Nucleus Scientific, Inc., Cambridge, MA (US)

( * ) Notice: Subject to any disclaimer, the term of this patent is extended or adjusted under 35 U.S.C. 154(b) by 305 days.

(21) Appl. No.: 13/175,240

(22) Filed: Jul. 1, 2011

(65) Prior Publication Data
US 2013/0002052 A1    Jan. 3, 2013

(51) Int. Cl.
*H02K 41/02*    (2006.01)

(52) U.S. Cl.
USPC ........................................ 310/12.25; 310/152

(58) Field of Classification Search
USPC .......... 310/12, 14–15, 20, 24, 37, 46, 48, 152
IPC ...................................................... H02K 41/03
See application file for complete search history.

(56) References Cited

U.S. PATENT DOCUMENTS

| | | | |
|---|---|---|---|
| 3,118,432 A | 1/1964 | Peterson | |
| 3,289,886 A | 12/1966 | Goldsholl et al. | |
| 3,479,541 A | 11/1969 | Russell | |
| 3,575,341 A | 4/1971 | Tarver | |
| 3,799,035 A * | 3/1974 | Lamm | 91/493 |
| 3,964,450 A | 6/1976 | Lockshaw | |
| 4,228,373 A | 10/1980 | Funderburg | |
| 4,345,174 A | 8/1982 | Angus | |
| 4,384,221 A | 5/1983 | Brandly | |
| 4,404,503 A | 9/1983 | Ward et al. | |
| 4,473,763 A | 9/1984 | McFarland | |

(Continued)

FOREIGN PATENT DOCUMENTS

| | | |
|---|---|---|
| EP | 0435461 A2 | 7/1991 |
| EP | 616412 A1 | 9/1994 |

(Continued)

OTHER PUBLICATIONS

Aspen Systems, Preliminary Design of Linear Alternator Dynamometer for Free Piston Stirling Engines, REport (online) (Jun. 1985); Retrieved on Aug. 29, 2012; http://www.oml.gov/sci/ees/etsd/btric/eere_research_reports/thermally_activated_technologies/engine-driven/stirling_rankine/modeling_and_similation/ornl_sub_84_05907_1/ornl_sub_84_05907_1.pdf (162 pages).

(Continued)

*Primary Examiner* — Thanh Lam
(74) *Attorney, Agent, or Firm* — Wilmer Cutler Pickering Hale and Dorr LLP

(57) ABSTRACT

An electric device including: a stator assembly; and an actuator including a coil having an axis, wherein the stator assembly includes: a stator core arranged along a linear axis, the stator core made up of a plurality of magnets each characterized by a magnetic moment, the plurality of magnets arranged in a stack along the linear axis with the magnet moments of the plurality of magnets being co-linearly aligned parallel to the linear axis, wherein the plurality of magnets includes a first magnet and a second magnet positioned adjacent to each other in the stack separated by a gap and with their magnetic moments in opposition to each other, and wherein the actuator is arranged on the stator core with the coil of the actuator encircling the linear axis with the axis of the coil parallel to the linear axis.

22 Claims, 27 Drawing Sheets

(56) References Cited

U.S. PATENT DOCUMENTS

| | | | |
|---|---|---|---|
| 4,486,667 A | 12/1984 | Srogi | |
| 4,503,751 A | 3/1985 | Pinson | |
| 4,507,579 A | 3/1985 | Turner | |
| 4,698,608 A | 10/1987 | Kimble | |
| 4,981,309 A * | 1/1991 | Froeschle et al. | 280/6.157 |
| 5,036,930 A | 8/1991 | Bisel et al. | |
| 5,179,365 A | 1/1993 | Raggi | |
| 5,276,372 A | 1/1994 | Hammer | |
| 5,301,111 A | 4/1994 | Utsui et al. | |
| 5,345,206 A * | 9/1994 | Morcos | 335/222 |
| 5,631,507 A | 5/1997 | Bajric et al. | |
| 5,685,798 A | 11/1997 | Lutz et al. | |
| 5,696,413 A | 12/1997 | Woodbridge et al. | |
| 5,701,039 A * | 12/1997 | Parison et al. | 310/12.26 |
| 5,959,374 A * | 9/1999 | Anderson et al. | 310/13 |
| 6,113,119 A | 9/2000 | Laurent et al. | |
| 6,218,925 B1 | 4/2001 | Iwao | |
| 6,239,683 B1 | 5/2001 | Roessler et al. | |
| 6,291,901 B1 | 9/2001 | Cefo | |
| 6,321,863 B1 | 11/2001 | Vanjani | |
| 6,328,123 B1 | 12/2001 | Niemann et al. | |
| 6,552,450 B2 | 4/2003 | Harty et al. | |
| 6,575,078 B1 | 6/2003 | Wright | |
| 6,675,462 B1 | 1/2004 | Takahashi | |
| 6,852,061 B2 | 2/2005 | Schoon | |
| 6,909,223 B2 | 6/2005 | Miyazawa | |
| 6,948,578 B2 | 9/2005 | Prucher | |
| 6,974,399 B2 | 12/2005 | Lo | |
| 7,059,437 B2 | 6/2006 | Heinen | |
| 7,108,090 B2 | 9/2006 | Turner | |
| 7,126,233 B2 * | 10/2006 | Thomas et al. | 290/1 R |
| 7,150,340 B2 | 12/2006 | Beck et al. | |
| 7,156,196 B2 | 1/2007 | Katsaros | |
| 7,249,643 B2 | 7/2007 | Etzioni et al. | |
| 7,327,054 B2 | 2/2008 | Ng et al. | |
| 7,347,427 B2 | 3/2008 | Heinen | |
| 7,357,743 B2 | 4/2008 | Mao et al. | |
| 7,557,473 B2 | 7/2009 | Butler | |
| 7,621,167 B2 * | 11/2009 | Staffend | 72/368 |
| 7,679,234 B1 | 3/2010 | Tilton et al. | |
| 7,962,261 B2 * | 6/2011 | Bushko et al. | 701/37 |
| 8,362,660 B2 | 1/2013 | Hunter | |
| 8,519,575 B2 | 8/2013 | Hunter | |
| 2003/0034697 A1 | 2/2003 | Goldner et al. | |
| 2003/0234585 A1 | 12/2003 | Tu et al. | |
| 2004/0198170 A1 | 10/2004 | Tilbor et al. | |
| 2005/0164528 A1 | 7/2005 | Furguth | |
| 2005/0173851 A1 | 8/2005 | Lloyd | |
| 2005/0212640 A1 | 9/2005 | Chiang et al. | |
| 2005/0252706 A1 | 11/2005 | Thomas | |
| 2006/0049701 A1 | 3/2006 | Sato | |
| 2006/0071561 A1 | 4/2006 | Chiu et al. | |
| 2006/0125325 A1 | 6/2006 | Beaulieu | |
| 2007/0090697 A1 | 4/2007 | Bittner | |
| 2007/0120432 A1 | 5/2007 | Vaden | |
| 2008/0023237 A1 | 1/2008 | Houle | |
| 2008/0093913 A1 | 4/2008 | Katsaros | |
| 2008/0265690 A1* | 10/2008 | Sasaki et al. | 310/12 |
| 2009/0090334 A1 | 4/2009 | Hyde et al. | |
| 2009/0091196 A1 | 4/2009 | Cooper | |
| 2009/0146507 A1* | 6/2009 | Teramachi et al. | 310/12 |
| 2010/0033032 A1 | 2/2010 | Tang et al. | |
| 2010/0139600 A1* | 6/2010 | Russell | 123/149 A |
| 2010/0253465 A1 | 10/2010 | Yeh | |
| 2010/0253930 A1 | 10/2010 | Ito | |
| 2010/0289347 A1* | 11/2010 | Tu et al. | 310/28 |
| 2011/0082388 A1 | 4/2011 | Hunter et al. | |
| 2011/0108339 A1 | 5/2011 | Hunter | |
| 2011/0109051 A1 | 5/2011 | Hunter | |
| 2011/0109174 A1 | 5/2011 | Hunter | |
| 2011/0109413 A1 | 5/2011 | Hunter et al. | |

FOREIGN PATENT DOCUMENTS

| | | |
|---|---|---|
| EP | 1098429 A2 | 5/2001 |
| EP | 1587135 A1 | 10/2005 |
| EP | 1607251 A1 | 12/2005 |
| EP | 1848014 A1 | 10/2007 |
| GB | 2065983 A | 7/1981 |
| GB | 2344223 A | 5/2000 |
| JP | 2004175530 A | 6/1992 |
| JP | 2006050853 A | 2/2006 |
| WO | WO-2002095912 A1 | 11/2002 |
| WO | WO-2008010669 A1 | 1/2008 |
| WO | WO-2011057051 A1 | 5/2011 |
| WO | WO-2011057052 A1 | 5/2011 |
| WO | WO-2011057070 A2 | 5/2011 |
| WO | WO-2011057071 A1 | 5/2011 |

OTHER PUBLICATIONS

International Search Report issued for PCT/US12/44684, dated Sep. 19, 2012 (1 page).

Final Office Action issued by the U.S. Patent and Trademark Office in U.S. Appl. No. 12/590,496 dated Jul. 19, 2012 (26 pgs.).

Frost & Sullivan, Overview of Electric Vehicles Market and Opportunities for Supply of Electric Motors. Jul. 26, 2009 (13 pgs.).

International Search Report and Written Opinion issued by the European Patent Office as International Searching Authority for International Application No. PCT/US10/55581 mailed Feb. 22, 2011 (10 pgs.).

International Search Report and Written Opinion issued by the European Patent Office as International Searching Authority for International Application No. PCT/US10/55582 mailed Feb. 21, 2011 (11 pgs.).

International Search Report and Written Opinion issued by the European Patent Office as International Searching Authority for International Application No. PCT/US10/55616 mailed May 27, 2011 (17 pgs.).

International Search Report and Written Opinion issued by the European Patent Office as International Searching Authority for International Application No. PCT/US10/55619 mailed Jan. 31, 2011 (7 pgs.).

Invitation to Pay Additional Fees and, Where Applicable, Protest Fee and Annex to Form PCT/ISA/206 Communication Relating to the Results of the Partial International Search Report from PCT/US2010/055616 mailed Feb. 11, 2011 (8 pgs.).

Muetze, et al. Performance Evaluation of Electric Bicycles, Fourth IAS Annual Meeting, Conference Record of the 2005. Retrieved on Jul. 8, 2009 from: http://www.ieeexplore.ieee.org. pp. 2865-2872.

Notice of Allowance issued by the U.S. Patent and Trademark Office in U.S. Appl. No. 12/590,496 dated Sep. 26, 2012 (9 pgs.).

Office Action issued by the U.S. Patent and Trademark Office in U.S. Appl. No. 12/590,493 dated Mar. 27, 2012 (32 pgs.).

Office Action issued by the U.S. Patent and Trademark Office in U.S. Appl. No. 12/590,496 dated Jan. 18, 2012 (34 pgs.).

Zapworld, ZAPPY3 Takes Scooters to the Next Dimension. Retrieved from http://www.zapworld.com/node/93. Jun. 2, 2004 (1 pg.).

* cited by examiner

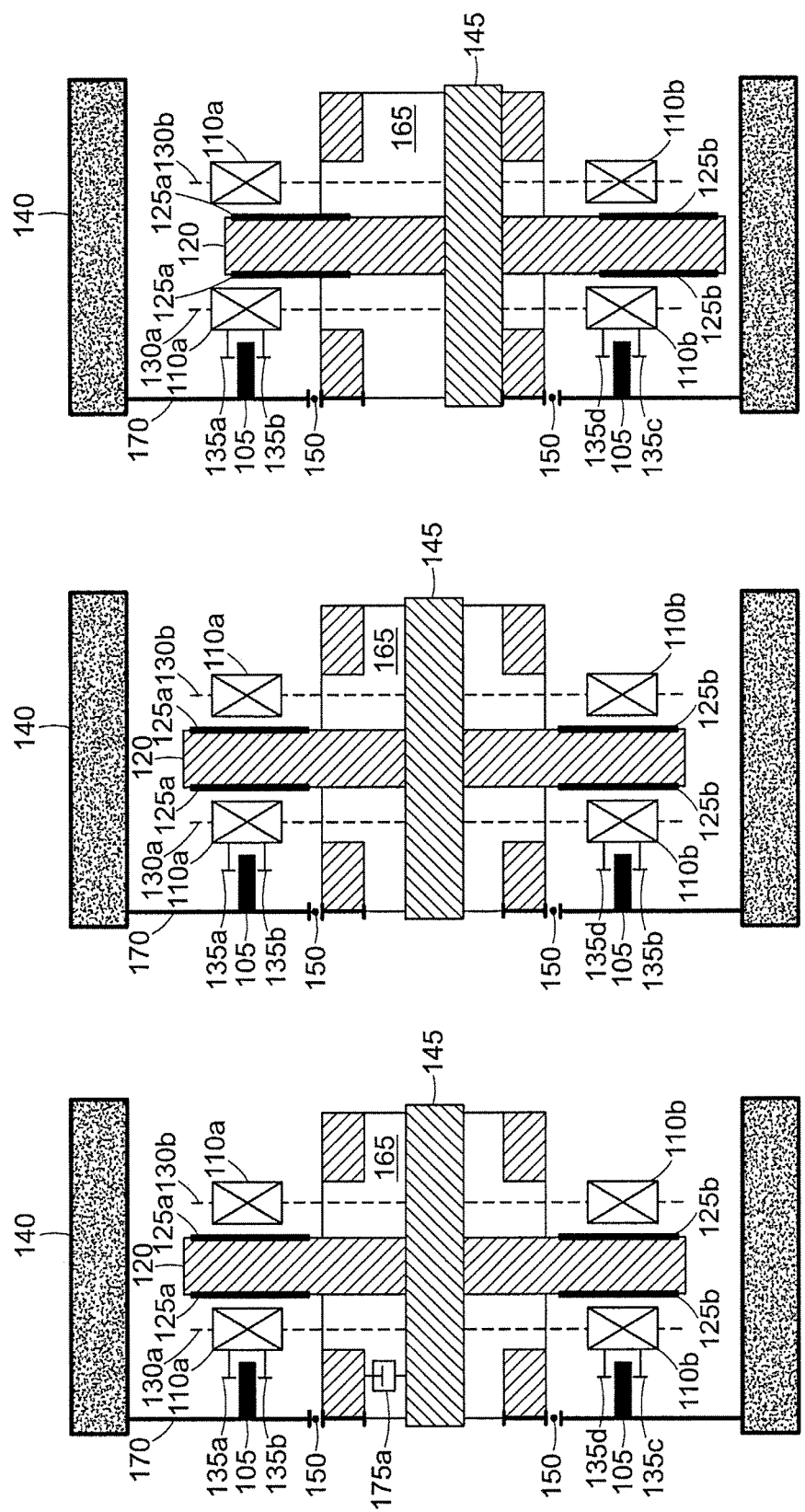

MAGNETIC STATOR ASSEMBLY

TECHNICAL FIELD

The invention relates generally to Lorentz-type actuator engines/generators and the magnetic stator assemblies that are used in such devices.

BACKGROUND

Before 1900, Henry Ford and Thomas Edison worked with each other to introduce an electric car. But gasoline powered engines soon prevailed over the electric motor and became the engines upon which a huge automobile industry was based. As compared to battery powered cars, gasoline fuel was cheaper, easier to distribute, had more energy content per kilogram, and was to become available in abundant supplies. But the electric car was not forgotten. Throughout the twentieth century, there have been periodic attempts to introduce electric vehicles. These tended to happen especially during periods of predicted energy shortages and threatened high fuel prices, when the search for alternatives took place. Until recently none of those efforts produced a viable commercial vehicle. Today, however, the interest in electric vehicles has experienced an unprecedented resurgence, fueled no doubt by recent concerns about global warming and renewed fears about the high costs of gasoline. Now there are hundreds of companies big and small designing and building electric vehicles, some of which have already made their way into the commercial mass markets.

Many of the current engine designs are based on rotary electric motors among which there are at least three general types: the DC motor, the synchronous AC motor, and the induction motor. A DC motor includes stationary permanent magnets in the stator and rotating electrical magnets in the form of coils on the rotor. Current is applied the electrical magnets on the rotor through a commutation ring and the magnetic fields produced by the permanent magnets interact with the current flowing through the coils to produce torque on the rotor. The AC induction motor typically includes a stationary electromagnetic stator and a rotating electromagnetic rotor. The rotating magnetic field pattern that is produced by the stator induces currents in the electromagnetic coils on the rotor. The induced currents in the rotor coils, in turn, interact with the rotating fields of the stator to cause rotational motion of the rotor. The AC synchronous motor, in contrast, has a permanent magnet rotor and electromagnets in the form of coils wound on the stator. Rotating magnetic fields are generated by driving the stator coils with time varying drive currents. The rotating magnetic fields produced by the stator cause the rotor to turn at the rate at which the fields are rotating.

A design that has emerged recently is based on the Lorentz-type actuator motor or linear motor. Unlike the other above-mentioned motors which directly produce torque through the motor's rotor shaft, the linear motor produces a linear back-and-forth movement of an actuator coil. That linear back-and-forth movement is then converted to rotary motion though interaction with a cam. The details of one such design is presented in U.S. Ser. No. 12/590,495, filed Nov. 9, 2009, and incorporated herein by reference.

The present application describes an improved design for the stator assembly in such a linear motor.

SUMMARY

In general, in one aspect, the invention features an electric device including: a stator assembly; and an actuator including a coil having an axis. The stator assembly includes a stator core including a plurality of magnets arranged in a stack along a linear axis, each of the magnets characterized by a magnetic moment, the plurality of magnets in the stack having their magnet moments co-linearly aligned parallel to the linear axis, the plurality of magnets including a first magnet and a second magnet positioned adjacent to each other in the stack separated by a gap and with their magnetic moments in opposition to each other, and wherein the actuator is arranged on the stator core with the coil of the actuator encircling the linear axis with the axis of the coil parallel to the linear axis.

Other embodiments may include one or more of the following features. The actuator is positioned on the stator core adjacent to the gap between the first and second magnets. The electric device also includes an outer enclosure structure having a first wall and a second wall, wherein the stator core and the actuator are within the outer enclosure structure, the outer enclosure structure including a second plurality of magnets forming at least part of at least one of the first and second sidewalls of the outer enclosure structure. The magnets of the second plurality of magnets are each characterized by a magnetic moment and the magnetic moments of the second plurality of magnets are oriented substantially perpendicular to the linear axis of the stator core. The outer enclosure structure includes a housing made of a material having a magnetic permeability significantly higher than that of air, the housing having a first wall and a second wall and wherein the second plurality of magnets are on at least one of the first and second walls of the housing. The housing is made of steel. The second wall of the housing is opposite the first wall of the housing. The second plurality of magnets are on both the first and second walls of the housing. The housing further includes a top wall and a bottom wall, the top wall bridging between a top end of the first sidewall and a top end of the second sidewall, the bottom wall bridging between a bottom end of the first sidewall and a bottom end of the second sidewall.

Still other embodiments may include one or more of the following features. The magnetic moments of the plurality of magnets in the stator core reverse direction along the linear axis at the first mentioned gap and at a second gap between neighboring magnets of the plurality of magnets. The electric device also includes a second actuator including a second coil and arranged on the stator core with the coil of the actuator encircling the linear axis with the axis of the coil parallel to the linear axis. The first mentioned actuator is positioned on the stator core adjacent to the first-mentioned gap between the first and second magnets and the second actuator is positioned on the stator core adjacent to the second gap. The plurality of magnets in the stator core are rare-earth magnets, e.g. neodymium iron boron magnets. The first and second coils wind around the stator core in the same direction.

Yet other embodiments may also include one or more of the following features. The electric device further includes: a cam assembly including a rotatable cam; and a plurality of cam followers interfacing with the cam, wherein each of the first and second actuators is coupled to the plurality of cam followers, the cam followers physically arranged to ride on the cam during operation of the electric device so as to convert linear motion of the first and second actuators to rotation of the cam.

In general, in another aspect, the invention features an electric device including: a stator assembly; a first actuator including a first coil; a second actuator including a second coil; a cam assembly including a rotatable cam; and a plurality of cam followers interfacing with the cam. The stator assembly includes a stator core arranged along a linear axis, the stator core including a plurality of magnets each characterized by a magnetic moment, the plurality of magnets arranged in a stack along the linear axis with the magnet moments of the plurality of magnets being co-linearly aligned parallel to the linear axis, wherein the magnetic moments of the plurality of magnets reverse direction along the linear axis at a first gap in the stator core and at a second gap in the stator core, wherein the first actuator is arranged on the stator core adjacent to the first gap with the first coil of the actuator encircling the linear axis with the axis of the first coil parallel to the linear axis, and wherein the second actuator is arranged on the stator core adjacent to the second gap with the second coil of the actuator encircling the linear axis with the axis of the second coil parallel to the linear axis, and wherein each of the first and second actuators is coupled to the plurality of cam followers, said cam followers physically arranged to ride on the cam during operation of the electric device so as to convert linear motion of the first and second actuators to rotation of the cam.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A-C show cross-sections of a representation of the rotary device of FIG. 1A.

DETAILED DESCRIPTION

The embodiment described herein is an improvement on the design of a magnetic stator within a linear Lorentz-type actuator engine described in U.S. Ser. No. 12/590,495, the contents of which are incorporated herein by reference. Before describing the details of the new magnetic stator, a description of the salient features of the prior design and its applications will first be presented to provide context.

The Linear Lorentz-type Actuator Motor

Figure 1A:
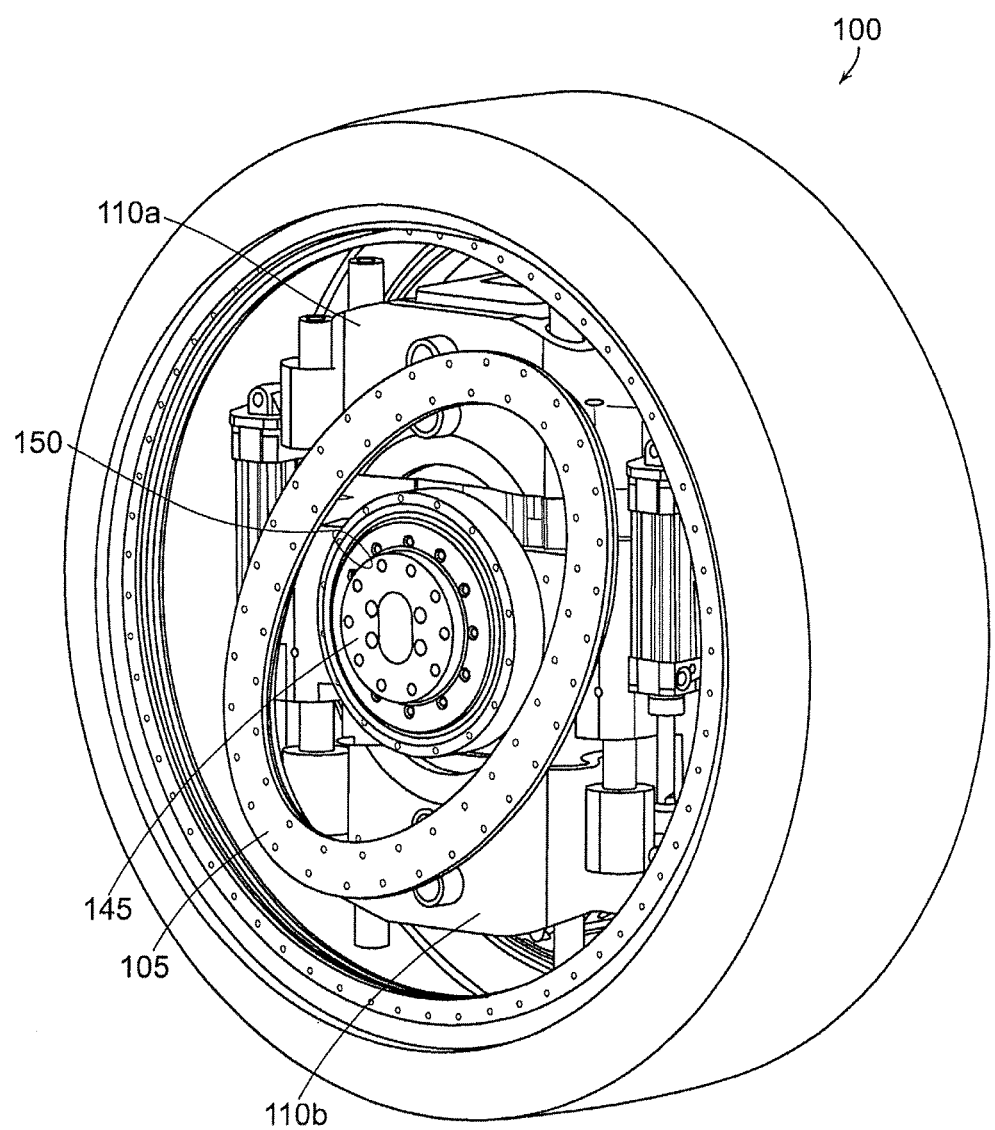
FIGS. 1A-B shows a rotary device in a wheel.

The linear Lorentz-type actuator engine is a rotary device 100 that is mounted inside a wheel on a vehicle, as illustrated in FIG. 1A. Rotary device 100 includes a magnetic stator assembly 120, opposed electromagnetic actuators 110a, 110b, and a linear-to-rotary converter (e.g., oval-shaped cam) 105. Rotary device 100 is attached to the chassis of a vehicle, for example, at a point on the far side of the wheel (not shown). Rotary device 100 is attached to the wheel via cam 105 using a circular support plate, for example, which has been removed to show the inside of the wheel. Such a plate is attached to both the rim of the wheel and cam 105 using fasteners, such as bolts. The wheel and cam support plate rotate relative to a hub 145 about a bearing 150.

Figure 1B:
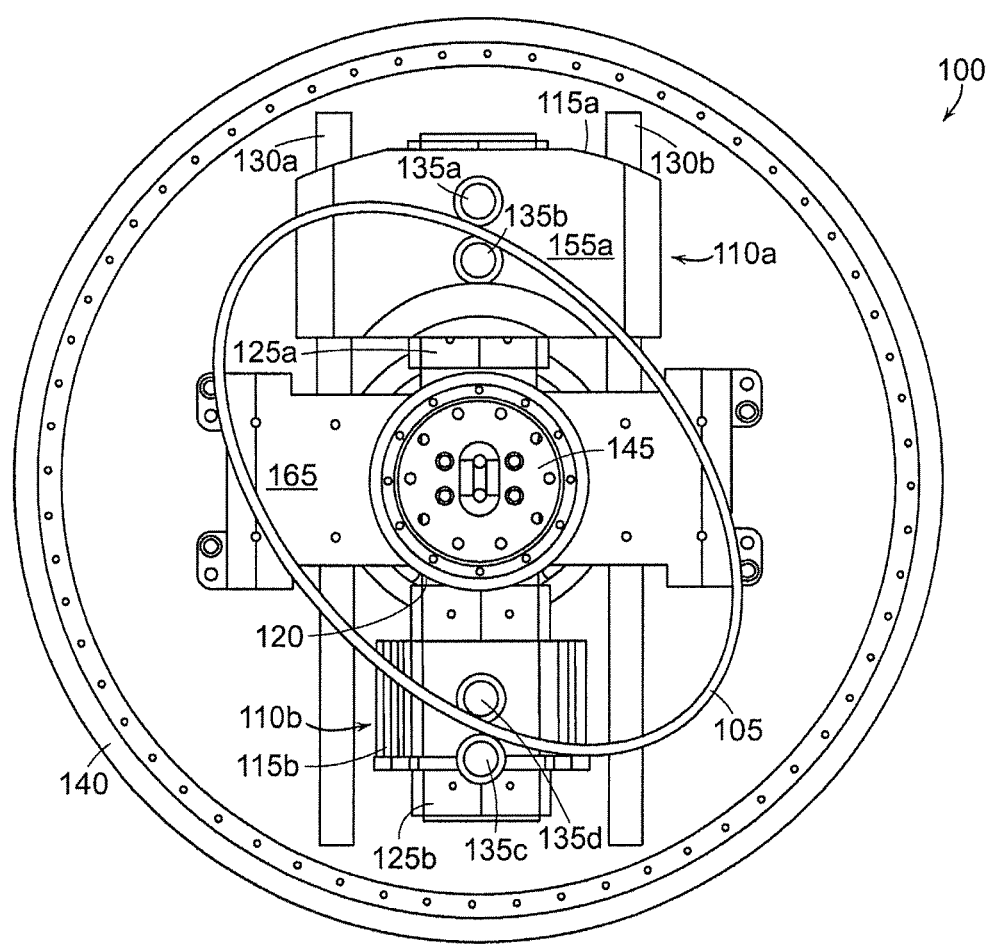

FIG. 1B shows rotary device 100 from the side of the wheel 140 with the tire and some other components removed. The core of rotary device 100 includes cam 105, two opposed electromagnetic actuators 110a, 110b, and a magnetic stator assembly 120. Electromagnetic actuators 110a, 110b each house a coil 115a, 115b that is arranged to reciprocate relative to magnetic stator assembly 120. One electromagnetic actuator 110a is shown having a housing 155a surrounding its coil 115a and the other electromagnetic actuator 110b is shown with its housing removed to show its coil 115b.

Magnetic stator assembly 120 depicted in FIG. 1B is oriented vertically and includes a plurality of magnetic stators 125a, 125b, each of which includes multiple individual permanent magnets. When current is applied to coils 115a, 115b of the electromagnetic actuators 110a, 110b (e.g., alternating current), actuators 110a, 110b are forced to move vertically along magnetic stator assembly 120 due to the resulting electromagnetic forces (i.e., the Lorentz forces). As is well known, when a coil carrying an electrical current is placed in a magnetic field, each of the moving charges of that current experiences what is known as the Lorentz force, and together they create a net force on the coil.

Rotary device 100 also includes a plurality of shafts 130a, 130b, coupled to a bearing support structure 165. Electromagnetic actuators 110a, 110b slide along the shafts using, for example, linear bearings. Attached to each electromagnetic actuator 110a, 110b is a pair of followers 135a-d that interface with cam 105 to convert their linear motion to rotary motion of the cam. To reduce friction, followers 135a-d freely rotate so as to roll over the surfaces of cam 105 during the operating cycle. Followers 135a-d are attached to electromagnetic actuators 110a, 110b via, for example, the actuators' housings. As electromagnetic actuators 110a, 110b reciprocate, the force exerted by followers 135a-d on cam 105 drives cam 105 in rotary motion.

Figure 1C:
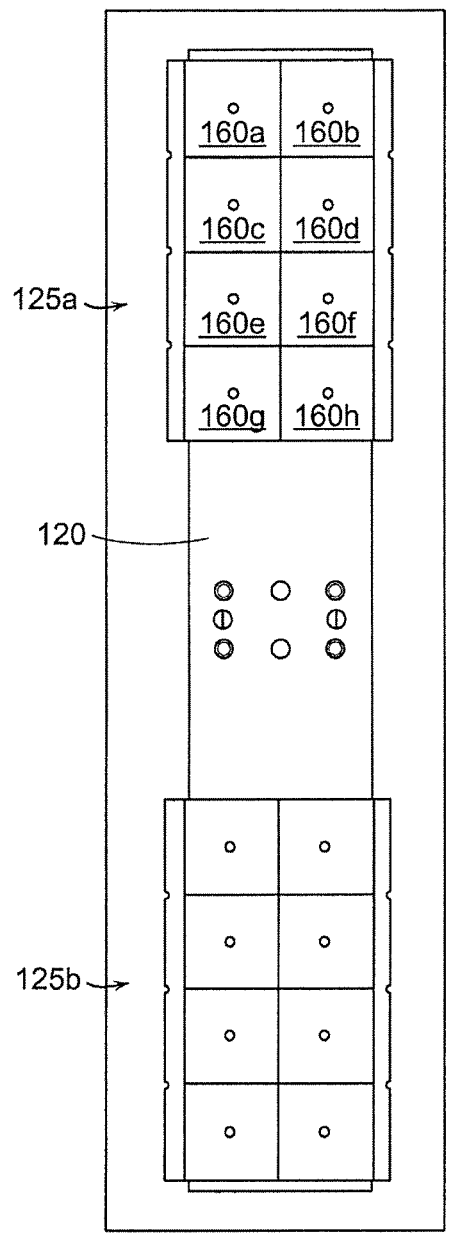
FIG. 1C shows a magnetic stator assembly.

FIG. 1C illustrates magnetic stator assembly 120 with two magnetic stators 125a, 125b. Magnetic stators 125a, 125b each include multiple magnets. For example, magnetic stator 125a includes, on one end surface portion, eight magnets 160a-h. All of the magnets 160 have their magnetic moments oriented perpendicular to the surface on which they are mounted and in the same direction.

FIGS. 2A-C illustrate through cross-sectional views how the rotary device operates. The rotary device of FIG. 2A is within a wheel 140 of a vehicle and includes a hub (or mount) 145 coupled to a magnetic stator assembly 120 having two magnetic stators 125a, 125b. Also shown are two electromagnetic actuators (including coils) 110a, 110b that reciprocate relative to the magnetic stator assembly 120 along shafts 130a, 130b (shown as dashed lines). Shafts 130a, 130b are coupled to a bearing support structure 165, keep the components of the device in vertical alignment, and prevent wheel 140 from falling off of the rotary device. A cam plate 170 coupled to wheel 140 is rotably coupled to bearing support 165 through a bearing 150. Affixed to cam plate 170 is a cam 105 used to drive plate 170 and, thus, wheel 140 in rotary motion. Cam 105 is driven by the reciprocation of the electromagnetic actuators 110a, 110b using followers 135a-d that are coupled to electromagnetic actuators 110a, 110b and that interface with cam 105. Also included in the example device is a damper 175a coupling the bearing support 165 and the mount 145. The damper 175a suspends the mount 145 above the ground and may allow for some movement between bearing support 165 and mount 145, depending on the amount of resistance of the damper. For example, if the damper is a pneumatic damper, higher gas pressures inside the chambers of the damper allow for less movement than lower air pressures.

FIG. 2B illustrates that in the absence of damper 175a, the electromagnetic forces caused by the electromagnetic actuators 110a, 110b and magnetic stators 125a, 125b may suspend the mount 145 above the ground. If, however, electrical current is removed from the electromagnetic actuators 110a, 110b, the associated electromagnetic forces will also be removed and mount 145 will drop toward the ground, along with magnetic stator assembly 120 and vehicle chassis, as illustrated in FIG. 2C.

Figure 3A:
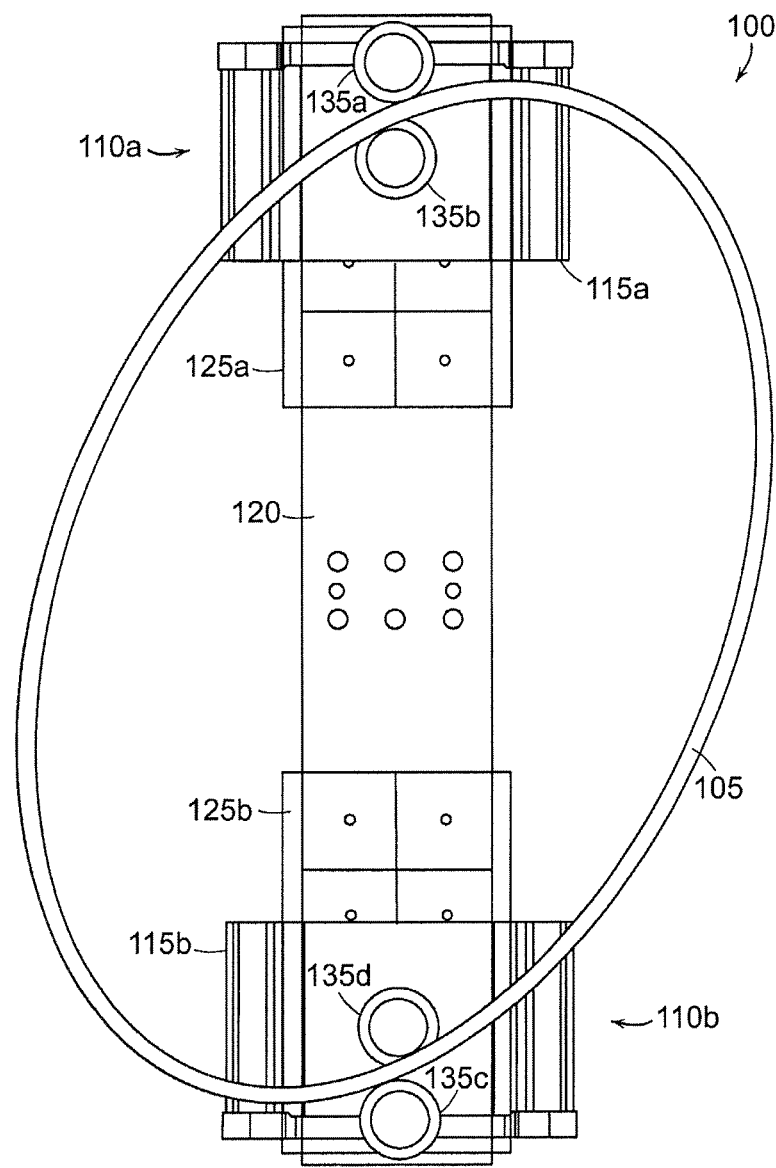
FIGS. 3A-C illustrate components of a rotary device in action.
Figure 3B:
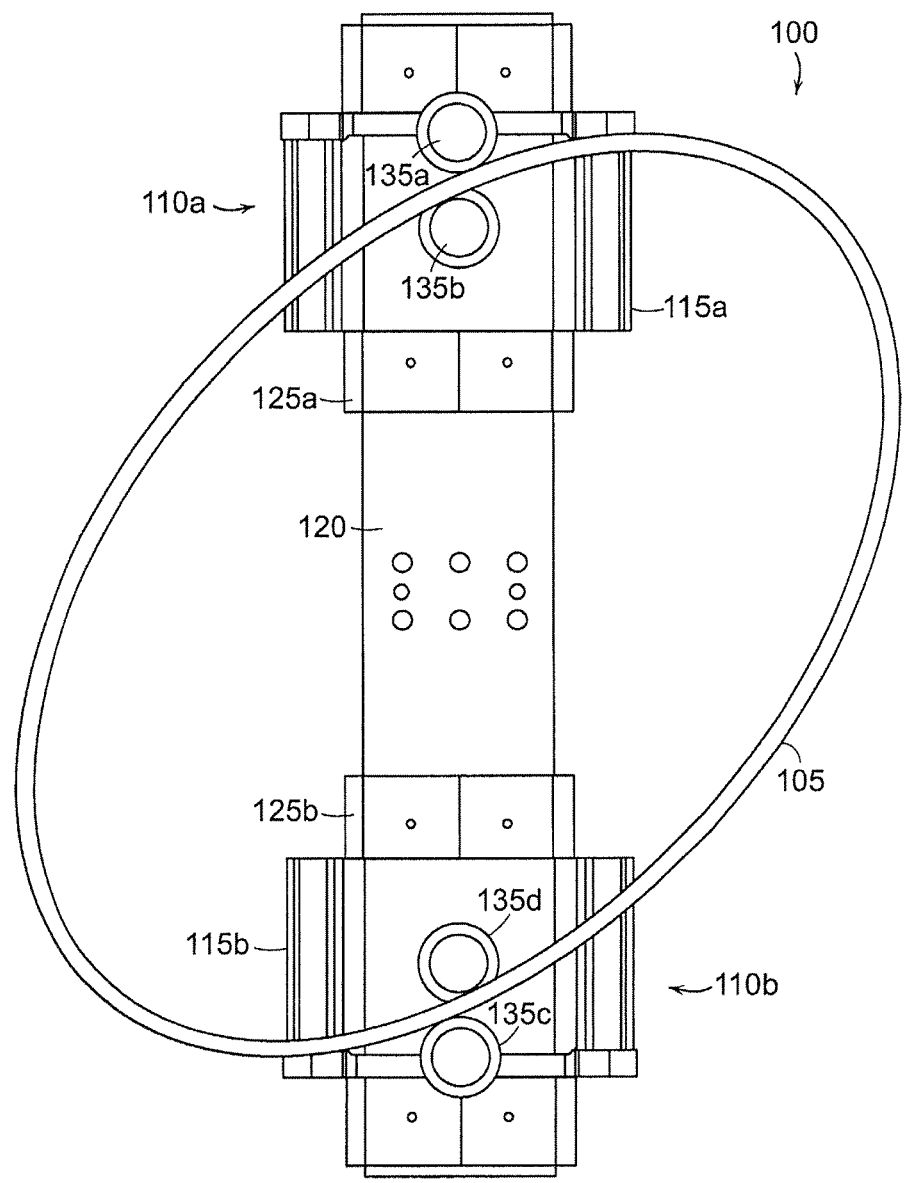
Figures 3C, 3D:
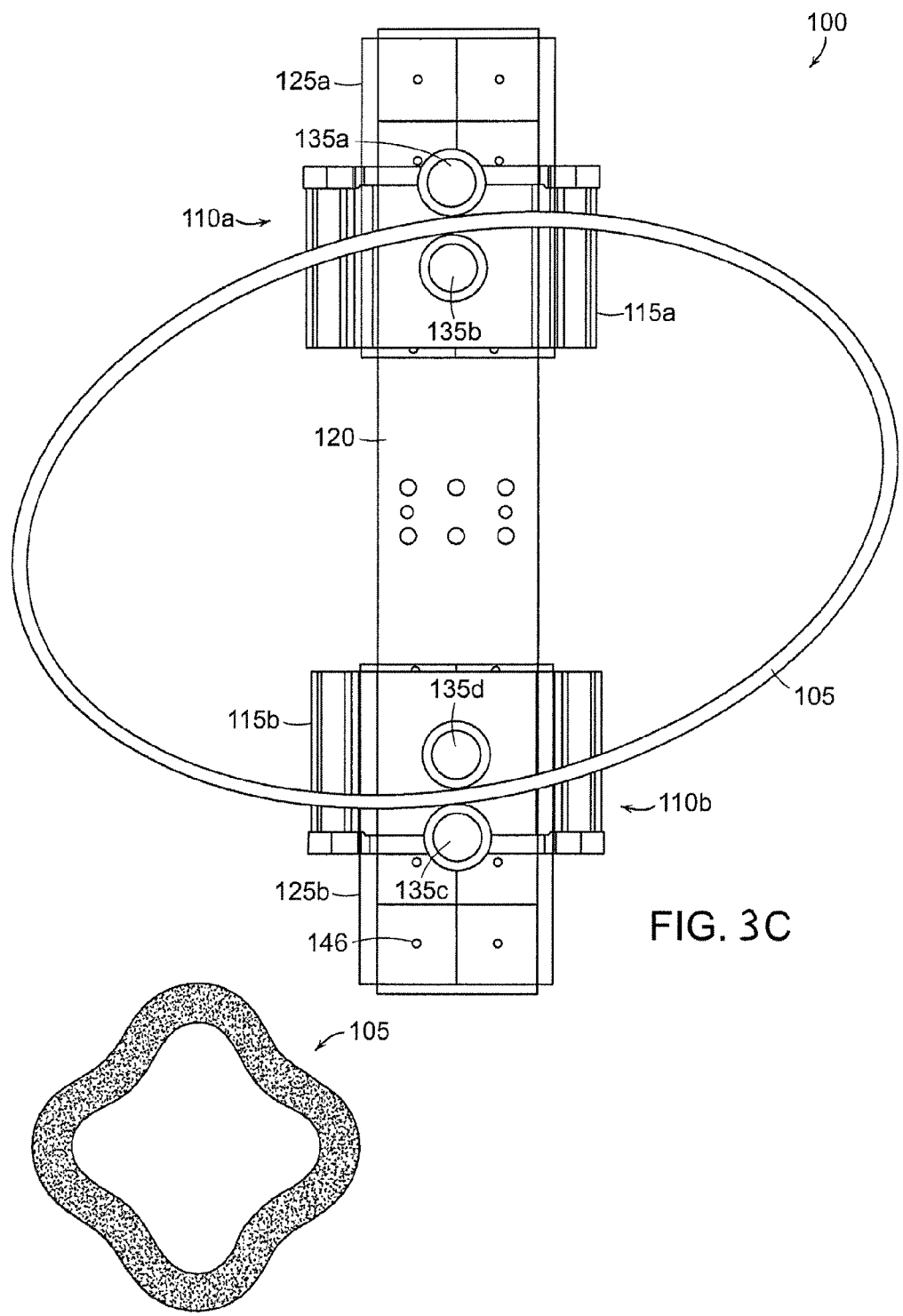
FIG. 3D shows another possible shape of the cam.

FIGS. 3A-C illustrate components of rotary device 100 in action, including the rotary device's electromagnetic actuators 110a, 110b (with associated coils 115a, 115b and followers 135a-d) and cam 105 moving relative to the magnetic stator assembly 120 (including associated magnetic stators 125a, 125b). The housings by which the followers are attached to the coils are not shown in these figures. As illustrated by FIGS. 3A-C, the reciprocal movement of the coils 115a, 115b in opposition drives cam 105 to rotate, which, in turn, may cause a wheel attached to cam 105 to rotate. Coils 115a, 115b are shown in FIG. 3A as being at almost their furthest distance apart. FIG. 3B shows that as coils 115a, 115b move closer to each other, coils 115a, 115b drive cam 105 to rotate in a clockwise direction, thereby causing any attached wheel to also rotate clockwise. In the example device, the force exerted on cam 105 is caused by the outer followers 135a, 135c squeezing-in on cam 105. FIG. 3C shows that coils 115a, 115b are even closer together causing further clockwise movement of cam 105.

After coils 115a, 115b have reached their closest distance to each other and cam 105, in this case, has rotated ninety degrees, coils 115a, 115b begin to move away from each other and drive cam 105 to continue to rotate clockwise. As coils 115a, 115b move away from each other, inner followers 135b, 135d exert force on cam 105 by pushing outward on cam 105.

It is noted that cam 105 is shown in the figures as an oval shape, but it may have a more complex shape, such as, for example, a shape having an even number of lobes, as illustrated in FIG. 2D. The sides of each lobe may be shaped in the form of a sine wave, a portion of an Archimedes spiral, or some other curve, for example. The number of lobes determines how many cycles the coils must complete to cause the cam to rotate full circle. A cam with two lobes will rotate full circle upon two coil cycles. A cam with four lobes will rotate full circle upon four coil cycles. Additionally, more lobes in a cam results in a higher torque.

In some devices, heat produced by coils 115a, 115b is dissipated by spraying a liquid coolant, such as, for example, water or mineral oil or another material known to serve well as a liquid coolant, on coils 115a, 115b. In the illustrated example, this is accomplished by spraying liquid through channels 146 in the magnets of magnetic stators 125a, 125b and onto coils 115a, 115b as they pass by the channels 146. The liquid coolant is transported to channels 146 through passageways in magnetic stator assembly 120. The sprayed liquid is then collected or scavenged for reuse or alternatively, in the case of water, it may be allowed to vent as steam from the rotary device.

Figure 4A:
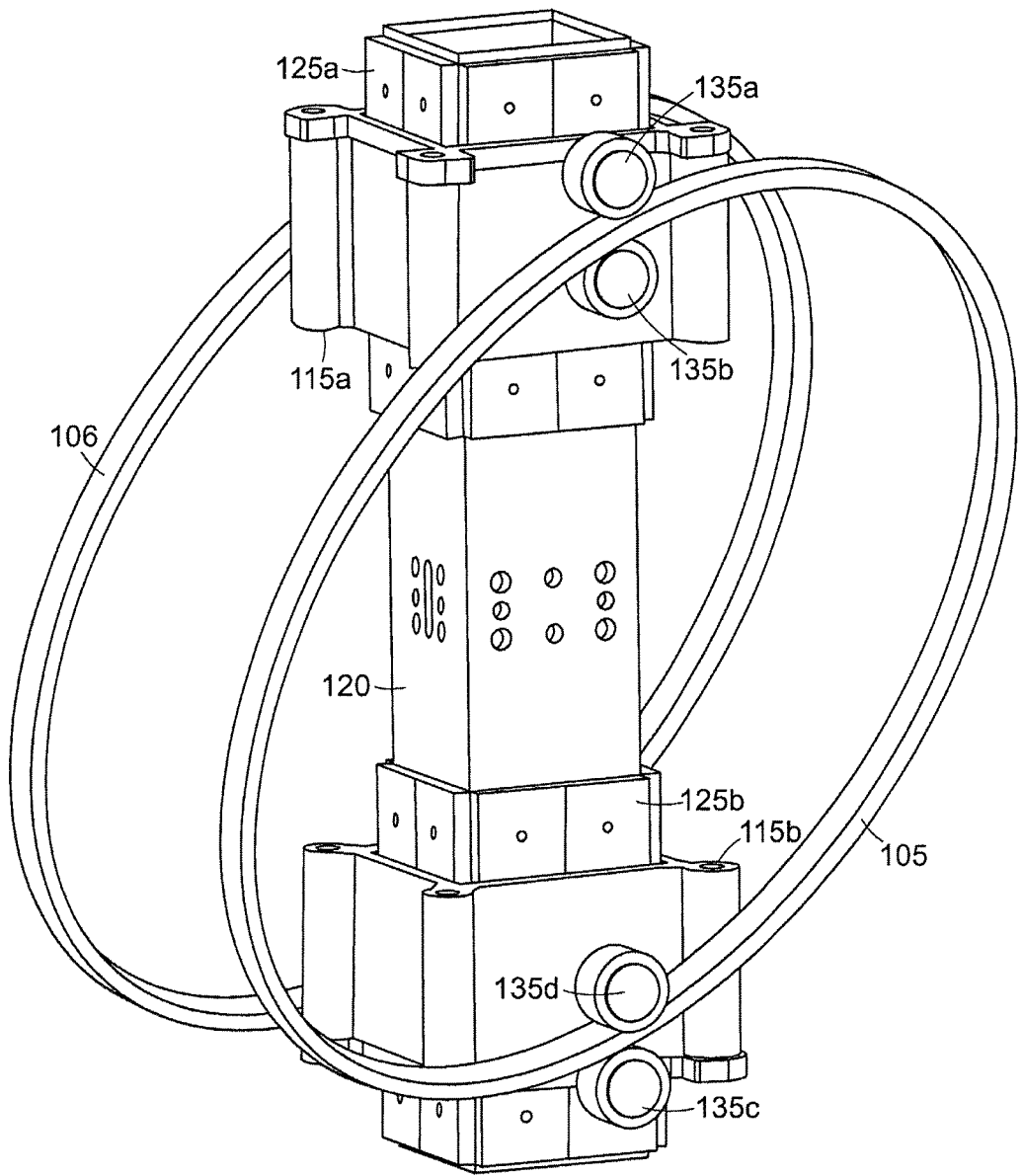
FIGS. 4A-B show an example rotary device with an additional cam and magnetic stator components.

FIG. 4A illustrates a rotary device similar to the device of FIGS. 3A-C, but with an additional cam 106 on the other side of magnetic stator assembly 120. The second cam 106 is attached to the other side of a wheel using, for example, another circular plate. Reciprocation of coils 115a, 115b acts to also drive the second cam 106 in rotary motion. Also in this example, magnetic stator assembly 120 is has a long extended box-shaped core of magnetically permeable material, with a magnetic stator 125a, 125b at either end. In that case, each magnetic stator 125a, 125b includes magnets on all four sides of the magnetic stator assembly 120. The box-shaped core, on which magnetic stators 125a, 125b are affixed in this device, acts as a return path for the magnetic fields of magnetic stators 125a, 125b. Also shown in FIG. 3A, coils 115a, 115b of the electromagnetic actuators have a rectangular shaped cross-section and arranged to surround the magnetic stators 125a, 125b. This arrangement allows for efficient utilization of the electromagnetic forces between coils 115a, 115b and magnetic stators 125a, 125b.

Figure 4B:
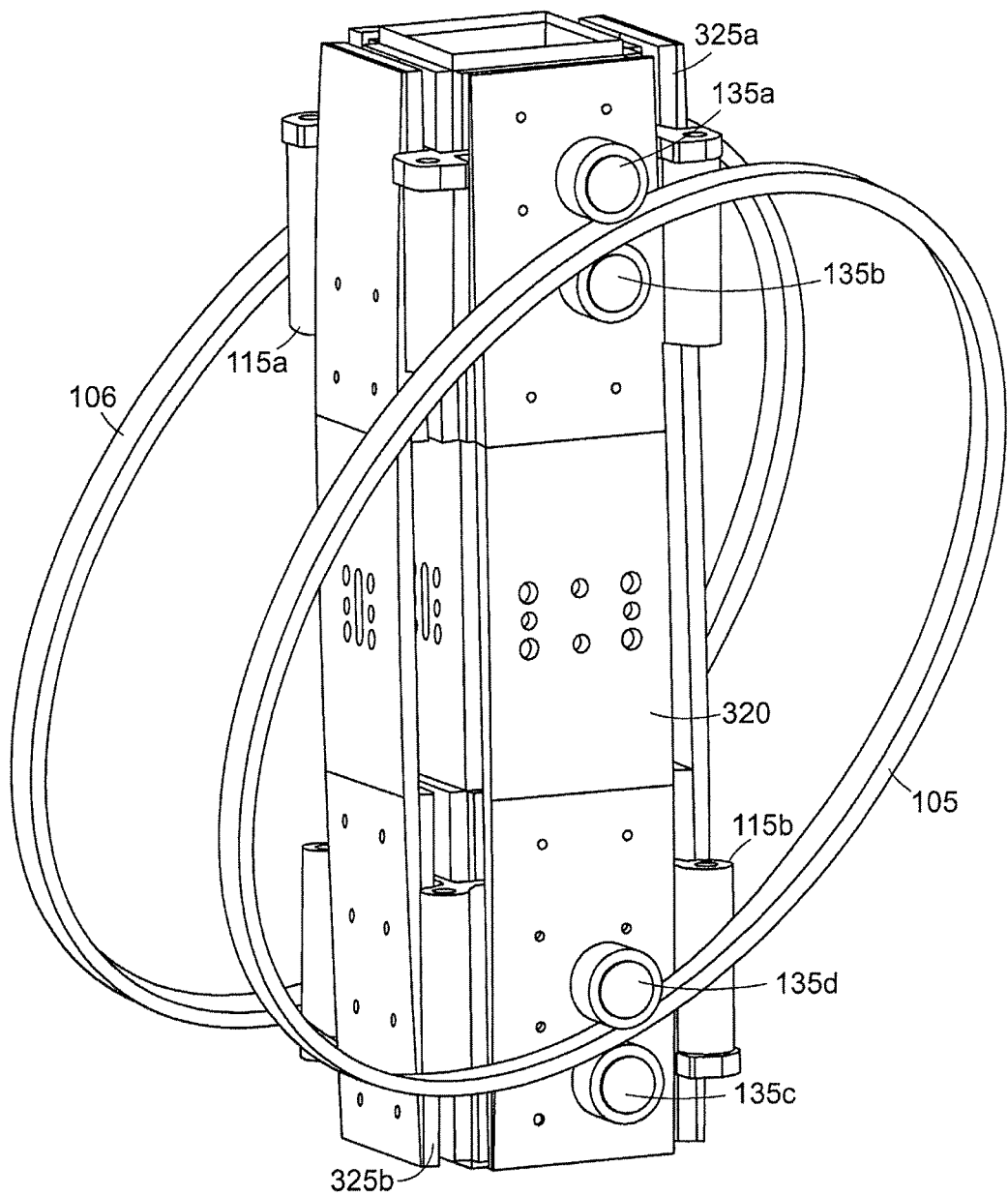

FIG. 4B illustrates the rotary device of FIG. 4A, but with additional magnets 325a, 325b arranged outside of the coils 115a, 115b. In this device, each end of the magnetic stator assembly 120 includes an additional four magnet arrays, one on each side of a rectangular cross-section coil 315a, 315b. The additional magnets 325a, 325b enables the creation of more electromagnetic force. Also shown in FIG. 4B is an additional magnetic return path 320 for the additional magnets 325a, 325b.

Figure 5A:
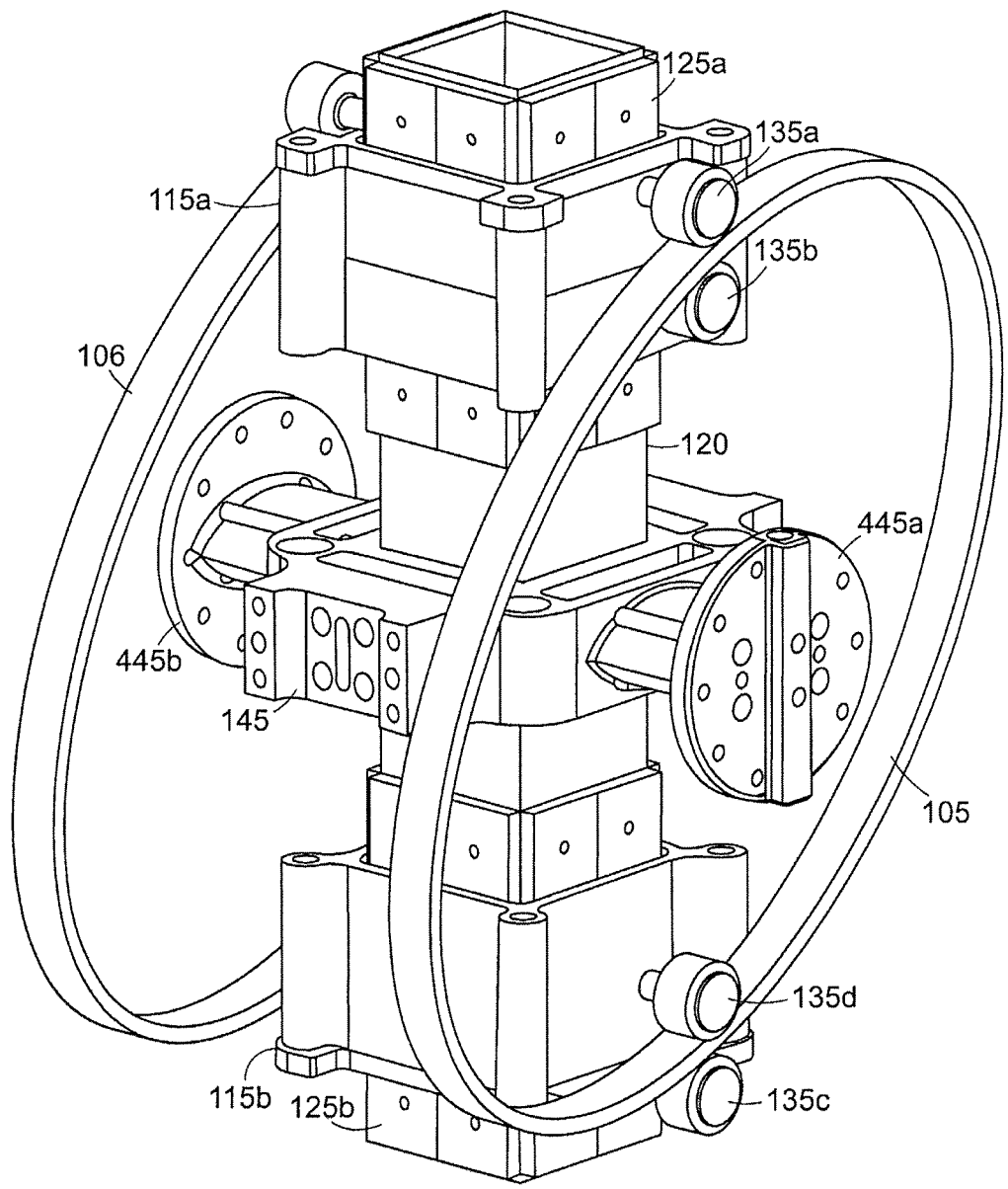
FIG. 5A shows a mount attached to the magnetic stator assembly of a rotary device.

FIG. 5A illustrates a mount 145 to which magnetic stator assembly 120, including magnets and return paths, is attached. The mount is part of, or further attached to, for example, a chassis of a vehicle (not shown). Specifically, mount 145 includes outer and inner hub plates 445a, 445b, the latter of which is bolted to the chassis of a vehicle. Delivery of electrical current to coils 115a, 115b is accomplished through electricity-conducting wires (not shown in FIG. 5A) that extend from mount 145 to coils 115a, 115b. The wires allow current to be delivered to coils 115a, 115b even as the coils reciprocate along magnetic stator assembly 120. The wires are electrically connected via a circuit to an electrical power source (not shown in FIG. 5A), which delivers controlled electrical current to coils 115a, 115b.

Figure 5B:
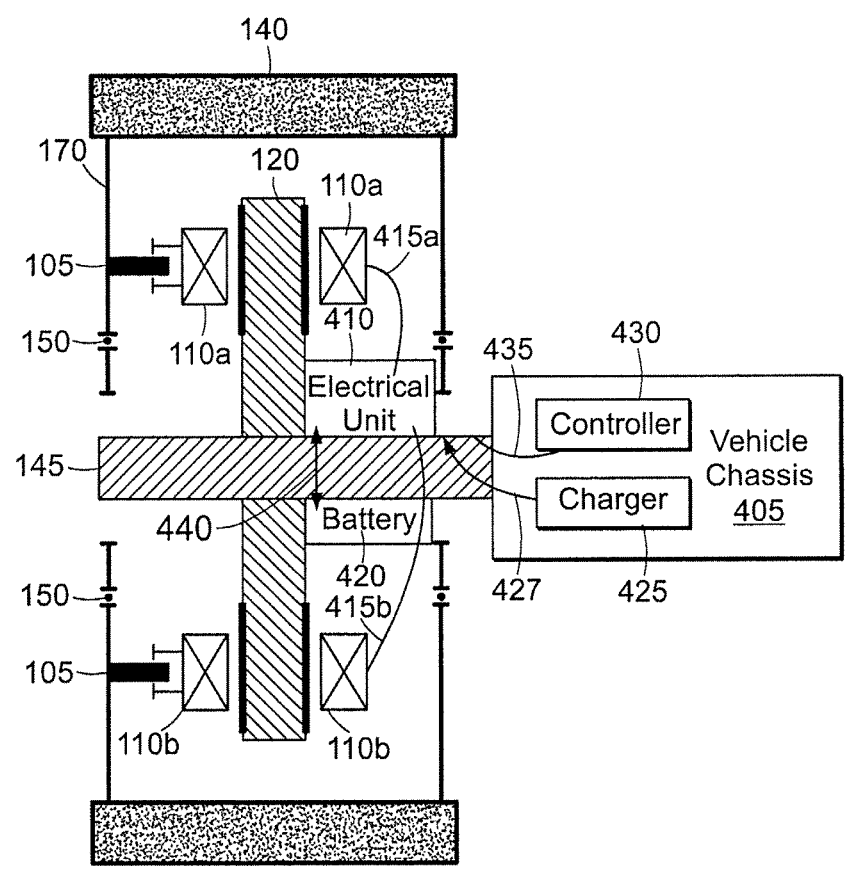
FIG. 5B is a representation of a cross-section of a rotary device attached to the chassis of a vehicle.

FIG. 5B illustrates a representation of a cross-section of a rotary device attached to the chassis of a vehicle 405. FIG. 4B is similar to what was shown in FIGS. 2A-C, but with some components removed for clarity. The figures shows a mount 145 coupled to the chassis of a vehicle 405 and a magnetic stator assembly 120. Also shown are a cam 105, cam plate 170, wheel 140, bearing 150, and electromagnetic actuators 110a, 110b. Coupled to mount 145 is an electrical unit 410, which is used to deliver a drive current to electromagnetic actuators 110a, 110b through a pair of wires 415a, 415b. Also coupled to mount 145 is a battery 420 for storing power to drive the device. Although electrical unit 410 and battery 420 are shown as being coupled to mount 145, electrical unit 410, battery 420, or both may, instead, be coupled to support structure 165 (see FIG. 2A).

Electrical unit 410 is controlled by a controller 430 on the chassis of vehicle 405 and through a fiber-optic cable 435 running between controller 430 and electrical unit 410. The rotary device also includes a bidirectional power line 440 connecting electrical unit 410 and battery 420. During operation as a motor, power flows from battery 420 to electrical unit 410 and on to electromagnetic actuators 110a, 110b. During operation as a generator, power flows from electromagnetic actuators 110a, 110b to electrical unit 410 and on to battery 420. The vehicle also includes a charger 425 for charging battery 420 using an external power source (not shown), such as an electrical outlet or gasoline engine in the case of a hybrid vehicle. During such charging, power flows from the external power source to charger 425 and on to battery 420 through line 427, electrical unit 410, and bidirectional power line 440. Thus, battery 420 can be charged by either an external power source or by the rotary device acting as a generator.

Through delivery of electricity to electromagnetic actuators 110a, 110b, electrical unit 410 controls the reciprocation of the coils. For example, when at speed, electrical unit 410 controls the constant reciprocation of the coils. In vehicular embodiments, controller 430 is operated by a driver (not shown) of the vehicle and, in response to actions by the driver, controller 430 sends commands to electrical unit 410 to cause the rotary device to accelerate, decelerate, or change direction, for example. In addition, electrical unit 410 can be configured to provide a drive current to electromagnetic actuators 110a, 110b to drive their coils in the same direction, thereby creating a vertical translational movement of wheel 140. Any translational movement of wheel 140, caused by the rotary device, can be sensed by electrical unit 410. In some configurations, electrical unit 410 is configured to absorb energy from the translational movement of the wheel by causing electromagnetic actuators 110a, 110b to act as electrical generators and dampers. This energy can be transferred to battery 420 for storage.

Figure 6A:
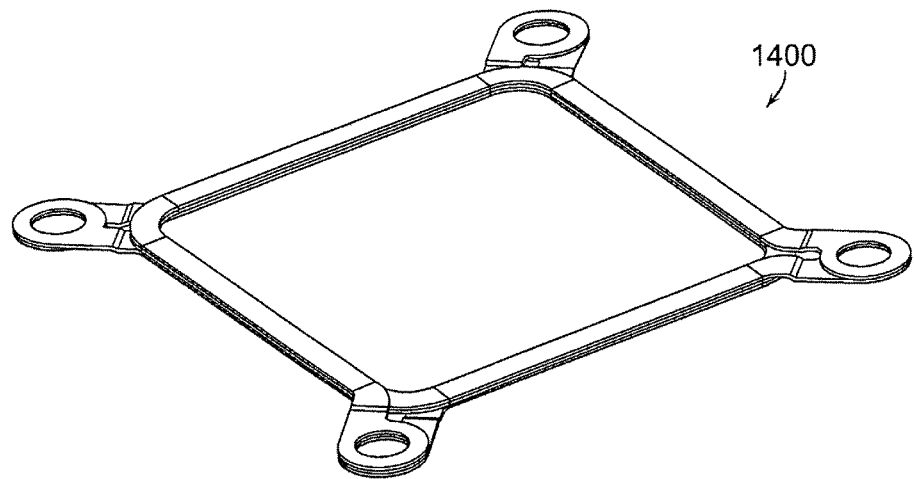
FIGS. 6A-B show the construction of a coil of an electromagnetic actuator.
Figure 6B:
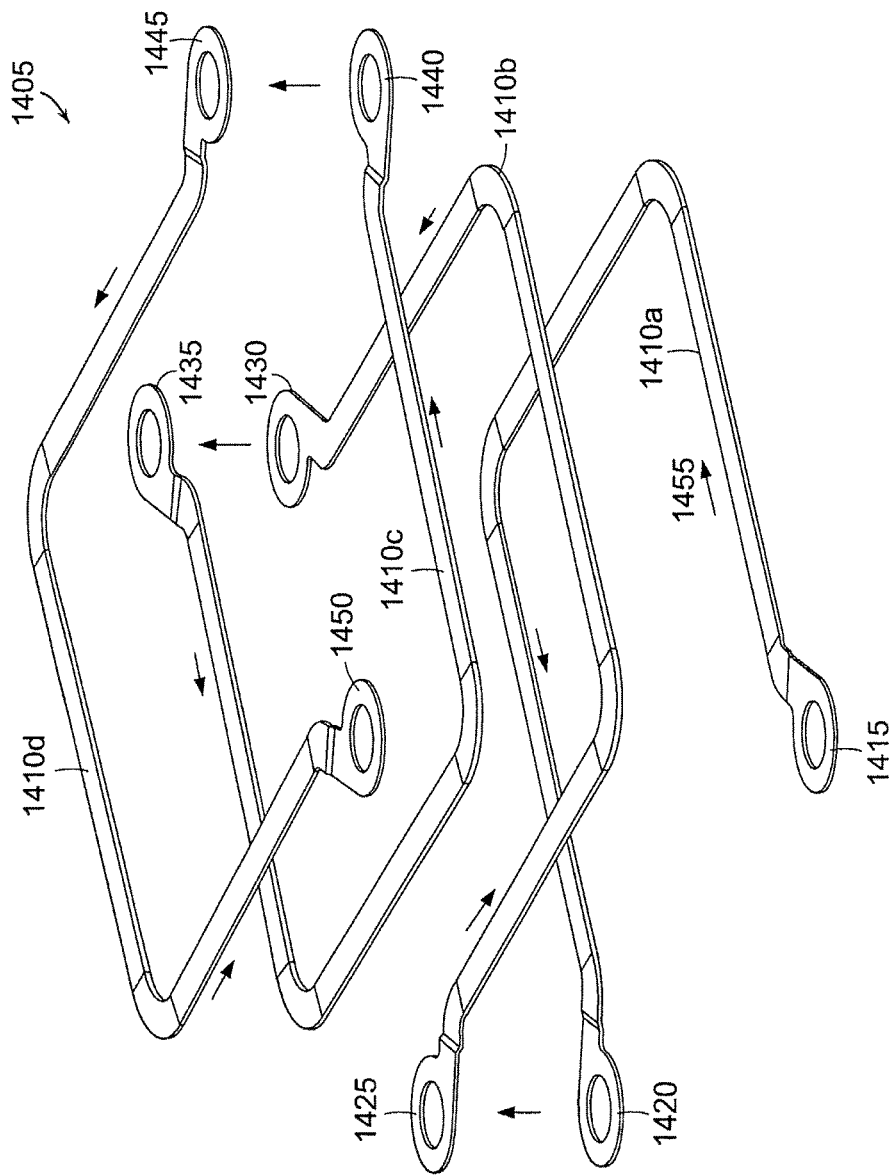

FIGS. 6A-B illustrate the construction of a coil of one of the electromagnetic actuators. Instead of being made from one continuous piece of material, the coil includes multiple flat coil segments stacked together and electrically coupled in series. FIG. 6A illustrates four coil segments that are combined into one coil 1400. The entire coil within an electromagnetic actuator may include a number of such coils. FIG. 6B illustrates an exploded view 1405 of the coil of FIG. 14A. Each segment 1410a-d of the example coil is a flat, U-shaped piece of metal formed by, for example, stamping or etching. Segments 1410a-d, which are all identical, are assembled in the configuration shown in FIG. 6B to form a full coil.

Each segment is rotated 270 degrees (or 90 degrees depending on the direction of rotation) with respect to the coil segment it follows in the stack of coil segments. This causes a starting end 1425 of an upper coil segment 1410b in the stack to align with a finishing end 1420 of an immediately lower coil segment 1410a in the stack. The coil including the four U-shaped coil segments 1410a-d, for example, loops around three times to finish at the same relative position (e.g., ends 1415 and 1450) that it started.

Manufacturing such an electric coil involves fabricating the multiple flat coil segments, stacking the multiple coil segments together where each coil segment is rotated with respect to the coil segment it follows, and fastening the coil segments together to form the electric coil.

To prevent the electrical current shorting between coil segments, each segment is coated with an electrically-insulating layer of material, except for the surfaces that connected one segment to the next. Alternatively, instead of coating the segments, layers of electrically-insulating material can be inserted between the coil segments. When the coil segments 1410a-d are assembled in the form illustrated in FIG. 14A, fasteners, such as bolts, are inserted through the openings shown at points 1415, 1420, 1425, 1430, 1435, 1440, 1445, and 1450. The segments 1410a-d could also be joined by soldering or brazing in addition to, or instead of, preloading the mechanical and electrical connections with fasteners.

Figure 7A:
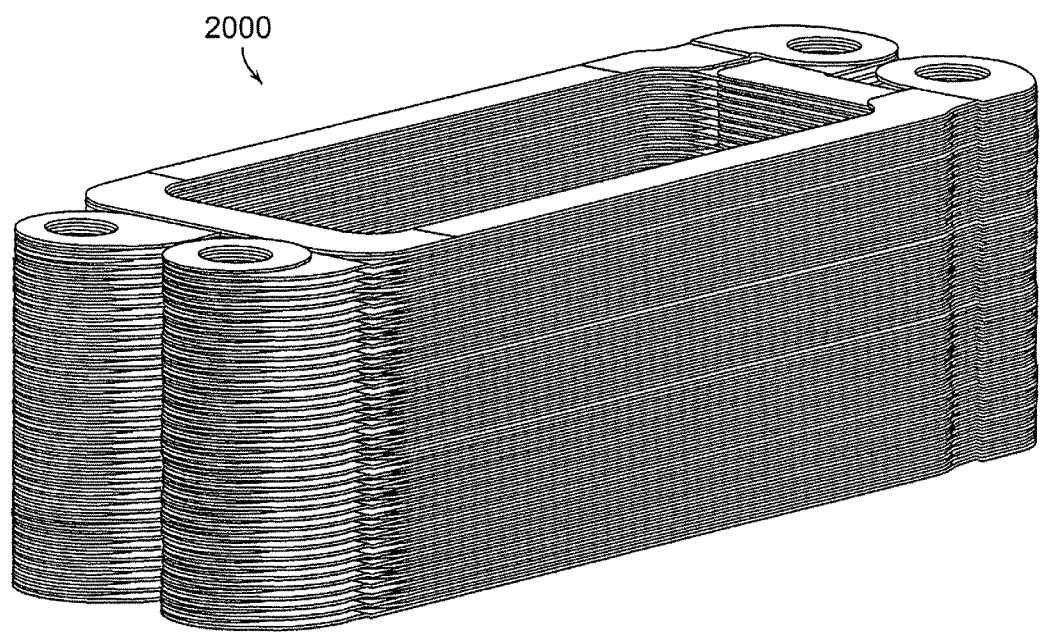
FIGS. 7A-C show the construction of a coil of an electromagnetic actuator.
Figure 7B:
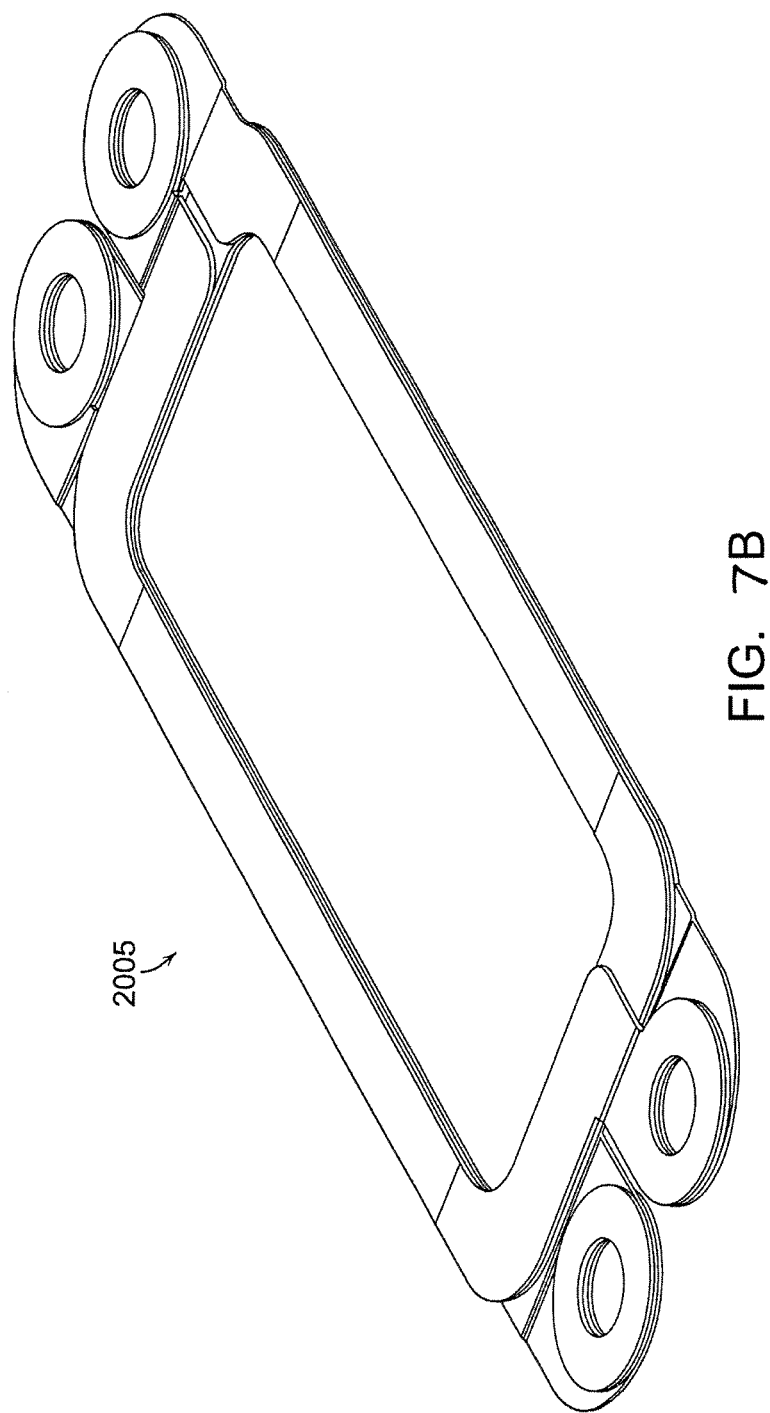
Figure 7C:
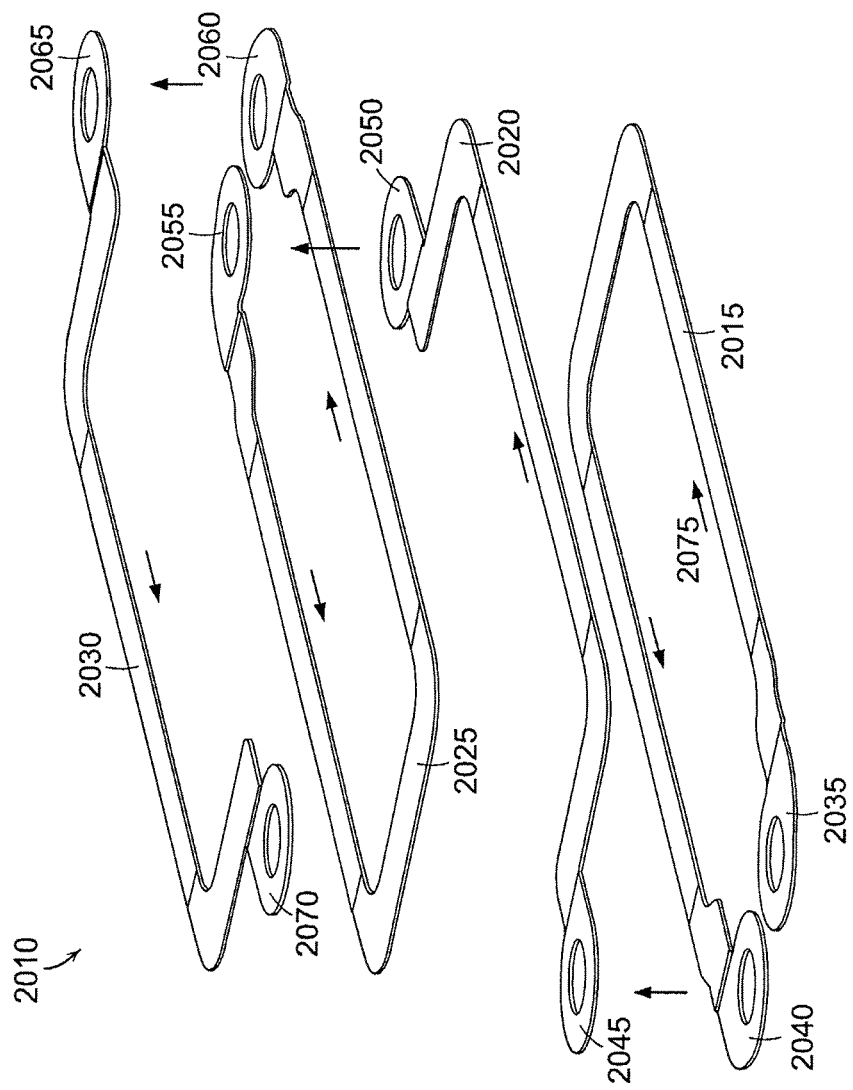

FIGS. 7A-C illustrate the construction of another coil configuration for an electromagnetic actuator. FIG. 7A shows an entire coil 2000, which may consist of multiple smaller coil sections. FIG. 7B illustrates four coil segments that are combined into one coil section 2005. A number of such segments may be combined to form the larger coil 2000 of FIG. 7A. As shown in FIG. 7C, which is an exploded view 2010 of the coil 2005, each segment 2015, 2020, 2025, 2030 of the example coil is a flat piece of metal formed by, for example, stamping or etching. The segments 2015, 2020, 2025, 2030 are assembled in the configuration shown in FIG. 7C to form a full coil. When assembled, electrical current 2075 flows through the coil, for example, from starting point 2035 to ending point 2070 and flowing from one segment to the next where they are coupled at their overlapping ends.

Figure 8:
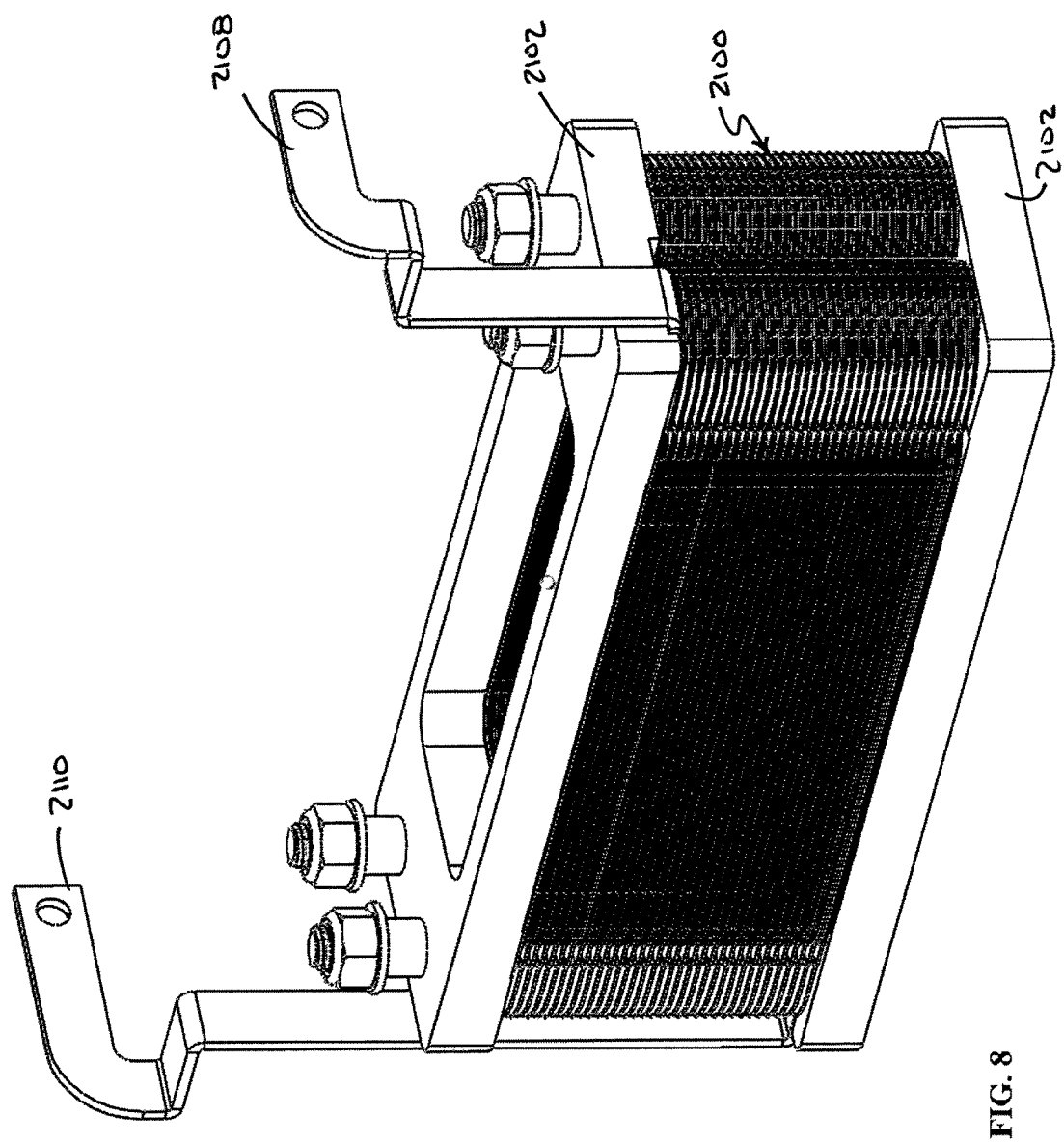
FIG. 8 shows a coil assembly.

FIG. 8 shows a coil assembly using the coil design of FIG. 7. It includes a coil 2100 made up of the multiple coil segments stacked on top of each other with an end plate 2102 made of non-conductive polycarbonate material on each end of the stack. This arrangement is held together by four bolts 2106, one at each corner and passing through holes in the end plates and the coil segments. Terminals 2108 and 2110 provide electrical connections to the ends the coil stack.

An Improved Magnetic Stator Design

An improved magnetic stator assembly design, which is described in detail below, includes at least two features that significantly enhance the performance of the engine as compared to an engine which employs the previously described magnetic stator assemblies. First, it includes a core constructed of a stack of permanent magnets with their poles oriented parallel to the direction of movement of the actuator. And second, it includes a housing made of a magnetically permeable material that forms a closed path around the arrangement of stator elements and which effectively contains and provides a return path for the magnetic fields produced by those stator elements.

Figure 9A:
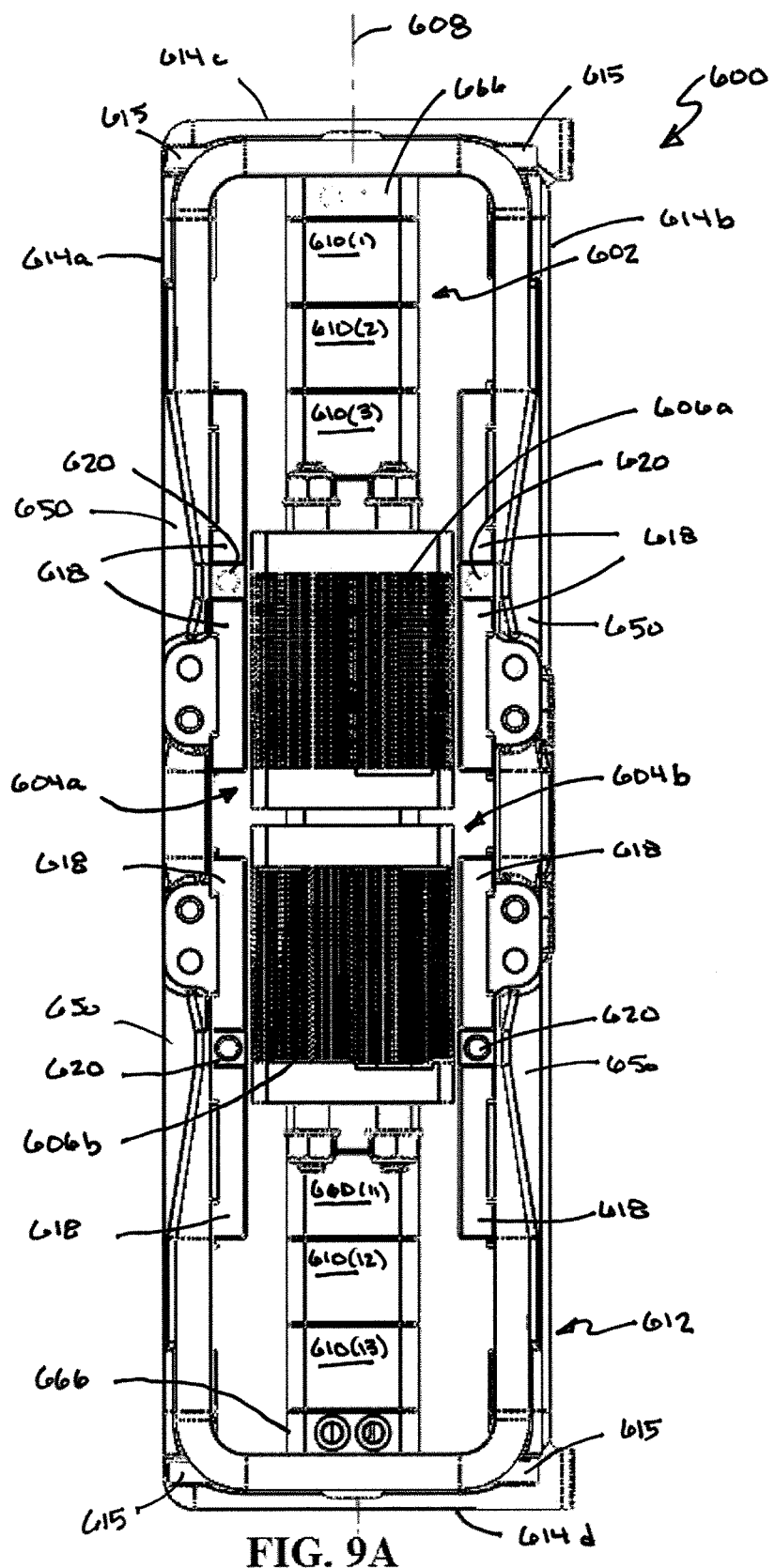
FIGS. 9A-C show a linear Lorentz-type actuator engine at various stages of operation.

Referring to FIG. 9A, a linear Lorentz-type actuator engine 600 with the improved stator design includes a stator core 602 with two actuator assemblies 604a and 604b mounted on stator core 602. Each actuator assembly 604a and 604b includes a coil 606a and 606b, respectively, that encircles stator core 602 with the axis of the coil aligned with the axis 608 of stator core 603.

Stator core 602 defines a linear track over which actuator assemblies 604a and 604b move back and forth in response to the drive currents that are delivered to the coils within the actuator assemblies. Stator core 602 is a stack of permanent magnets 610(1)-(13) with their magnetic moments arranged collinearly and aligned parallel to axis 608 of stator core 602. Stator core 602 is held within a housing 612 made of a metal of relatively high magnetic permeability. As will become more apparent in the following description, housing 612 provides a closed return path for the magnetic fields of the permanent magnets.

Figure 10A:
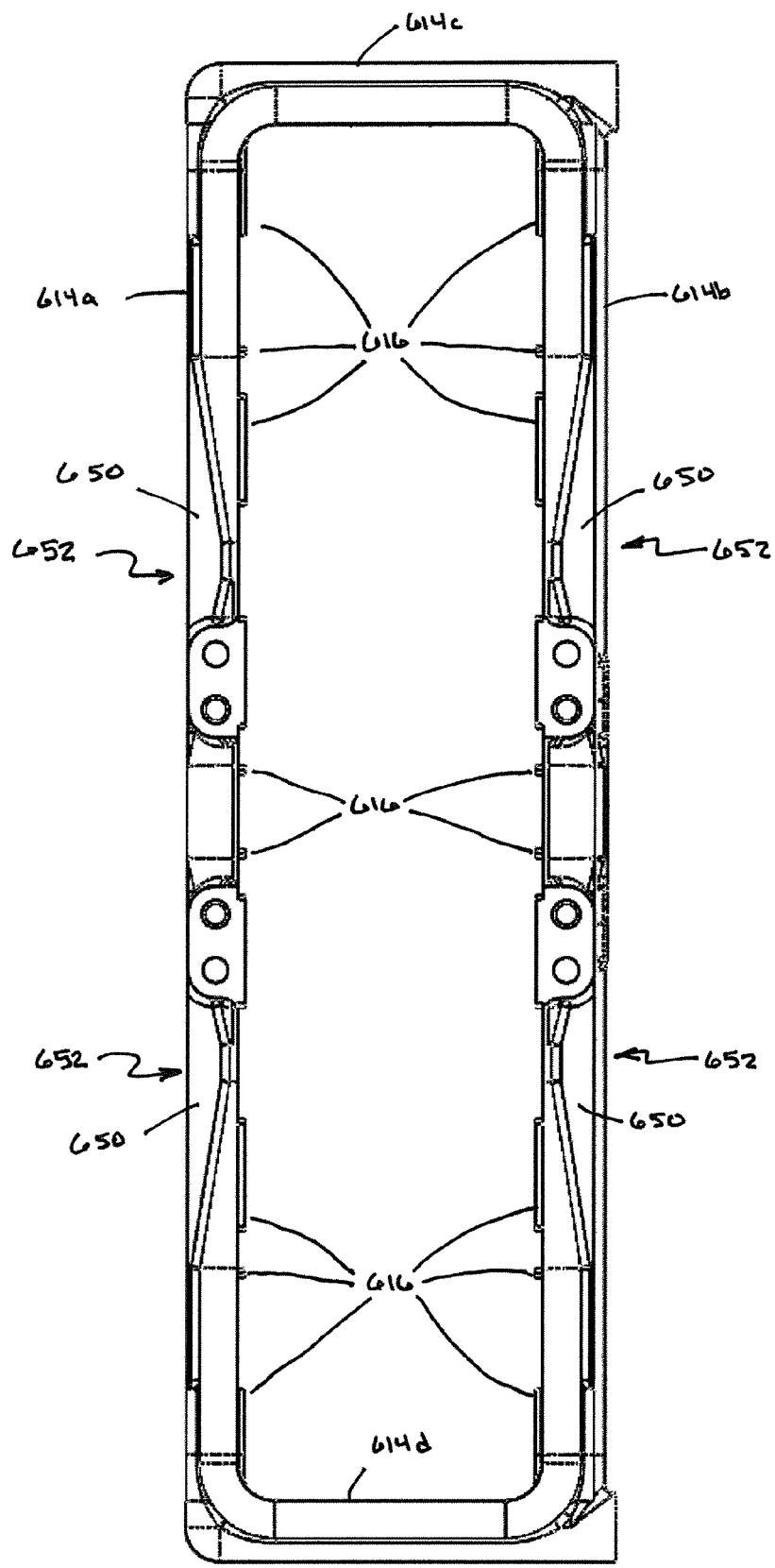
FIGS. 10A-B present two views of the housing portion of the engine of FIGS. 9A-C.
Figure 10B:
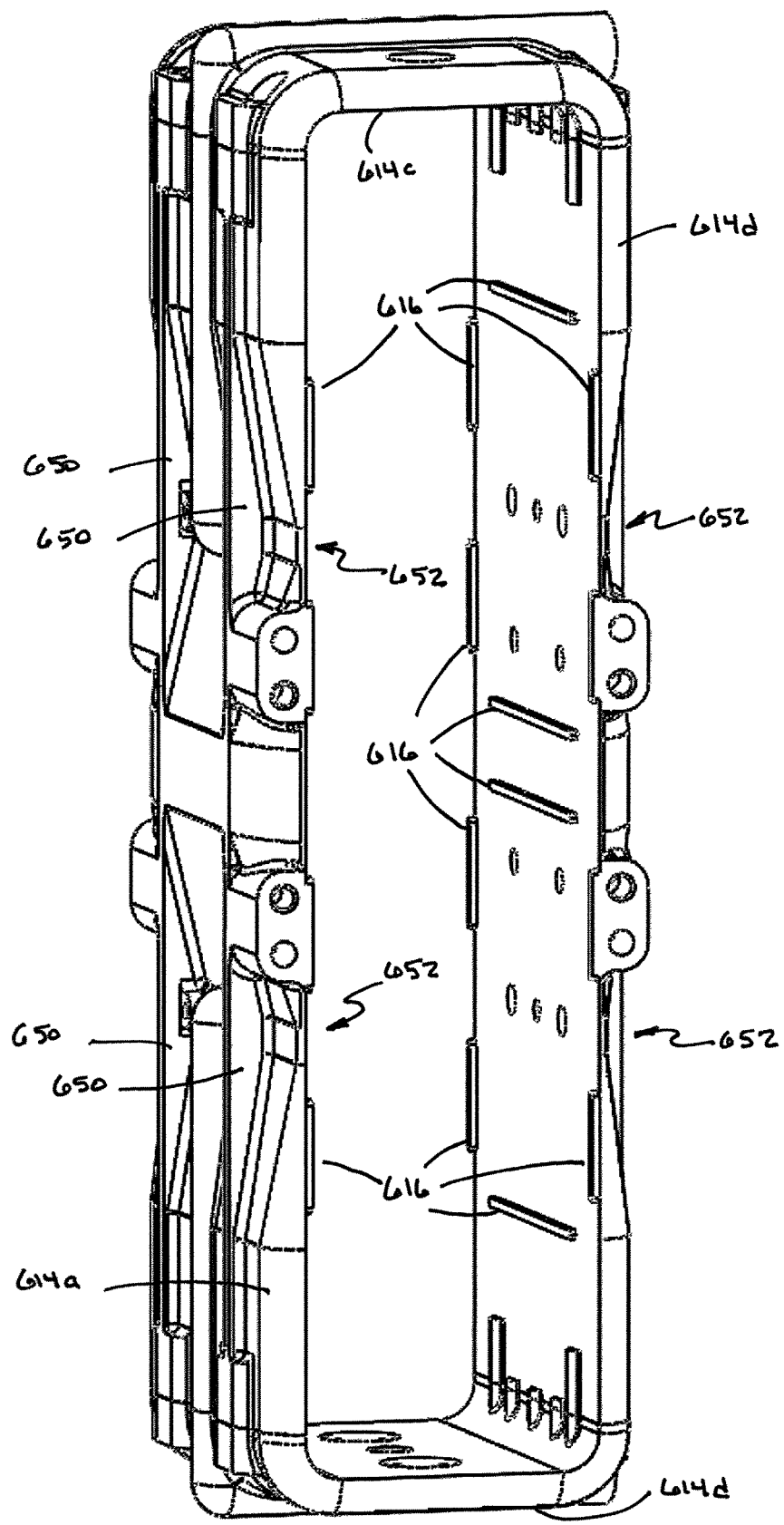

Also referring to FIGS. 10A-B, housing 612 includes a number of components that are assembled together. This includes a left sidewall 614a, a right sidewall 614b, a top plate 614c, and a bottom plate 614d. Top and bottom plates 614c and 614d are bolted into sidewalls with steel bolts 615.

Figure 11A:
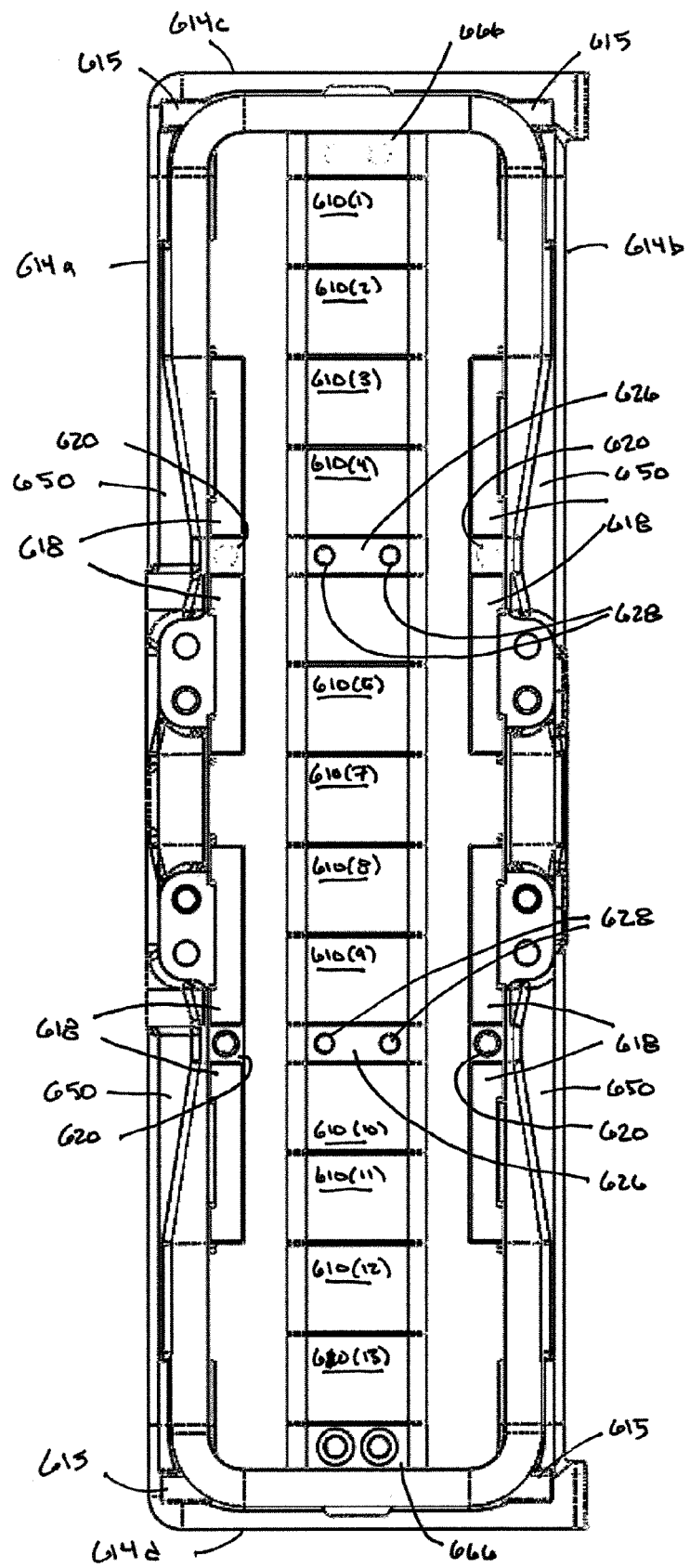
FIGS. 11A-B present two views of the housing and the arrangement of magnets within the Lorentz force engine of FIGS. 9A-C.
Figure 11B:
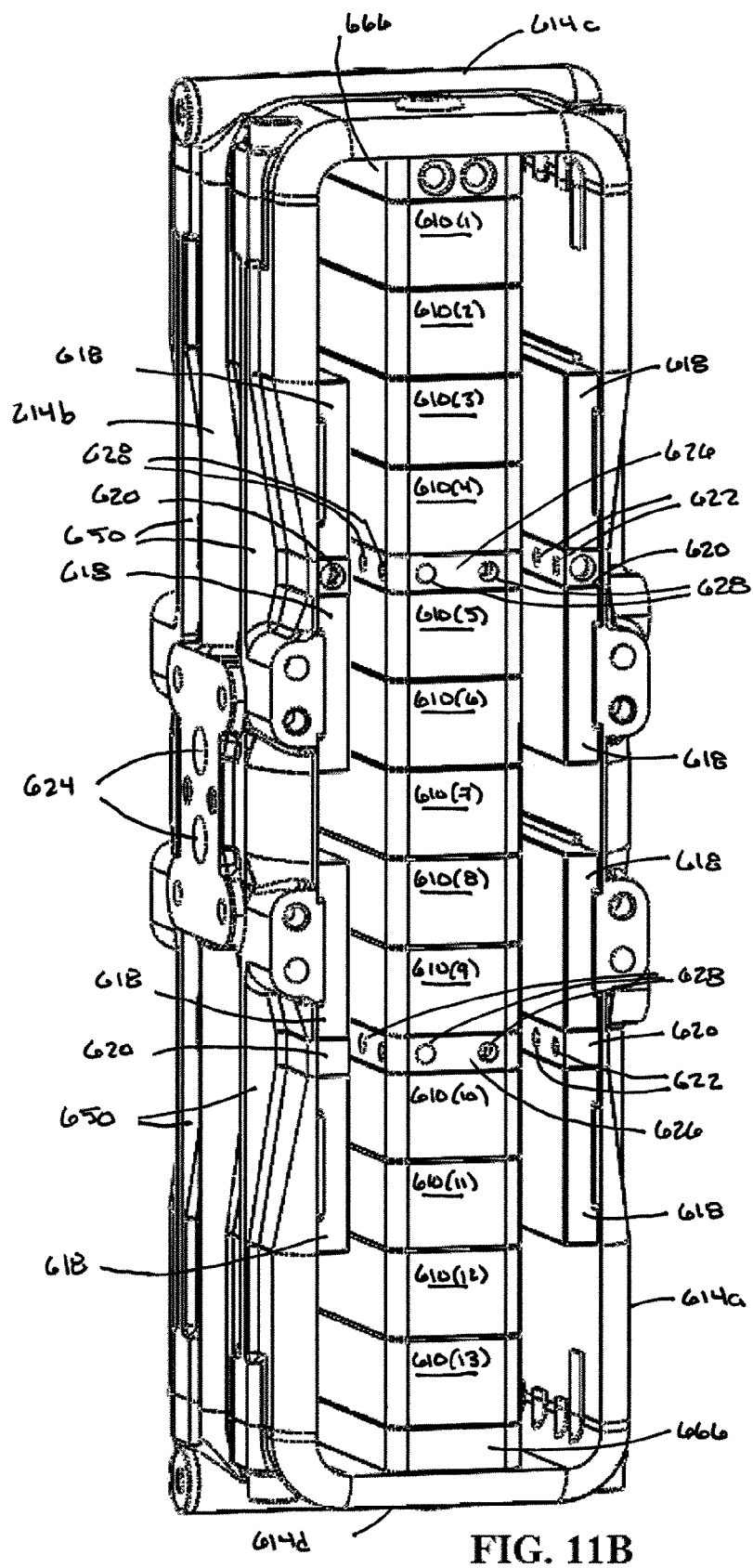

Each of the left and right sidewalls 614a and 614b includes alignment ridges 616. Between each set of four alignment ridges, there are two magnets 618 separated by a metal separator 620. The magnets are held firmly against the sidewall by magnetic attraction and without the need for other retaining means. Each of the magnets 618 is arranged on the sidewall with its magnetic moment perpendicular to the axis of stator core 602 so as to provide the most effective field for moving the current carrying coils. Each separator 620 includes several orifices 622 through which a coolant is injected into the housing during operation to cool the windings. (Orifices 622 can be seen more clearly in FIG. 11B.) Channels within housing 612 are aligned with passages in separator 620 and together they provide a pathway through which coolant is supplied to the orifices 622 for spraying onto the coils. Coolant is supplied to the channels within the housing through openings 624 in the side of one of the sidewalls. (The channels are described more fully below.)

Figure 12:
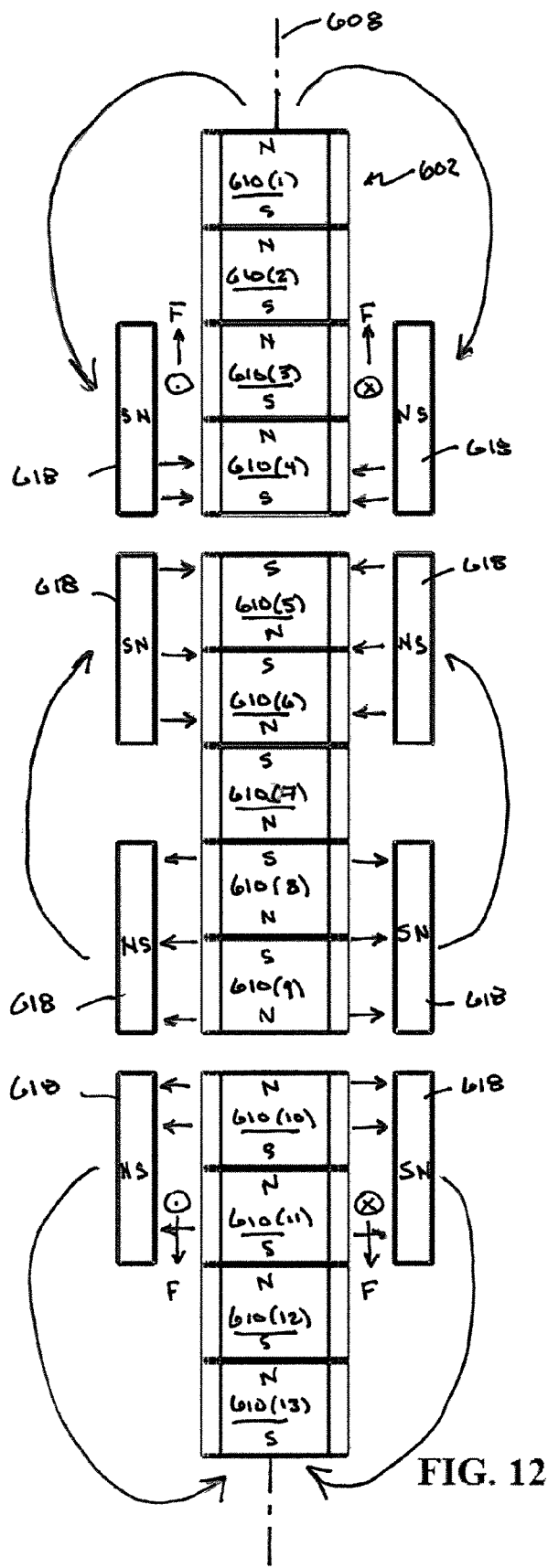
FIG. 12 show the arrangement of magnets in the linear Lorentz-type actuator engine of FIGS. 9A-C.

Also referring to FIG. 12, stator core 602 is made up of 13 magnets in a stack with a separator 626 between the $4^{th}$ and $5^{th}$ magnet from the top and another separator 626 between the $9^{th}$ and $10^{th}$ magnet from the top. The separators divide the core into three sections: an upper section, a middle section, and a lower section. When engine 600 is assembled, separators 626 are aligned with separators 620 that are between magnets 618 on the housing sidewalls 614a and 614b. And like the separators on the housing sidewalls, these separators also have orifices 628 through which coolant is injected into the housing interior during operation. There are two orifices 628 on each of the four sides of each separator 626. By means of the array of orifices in the separators on the sidewalls and in the stator core, coolant is sprayed onto the inside and outside surfaces of coils 606a and 606b during operation of the engine.

In the described embodiment, the magnets 610 and 618 are neodymium iron boron magnets (NdFeB), which is a commonly used rare-earth magnet and is among the strongest of the permanent magnets that are currently commercially available. Housing 612 is made of a low carbon steel such as 1018, 1010, or 1005, which have relative magnetic permeabilities (with zero magnetic field) greater than about 530. To provide some perspective on the size of the engine, which is being described, the permanent magnets are about 50 mm long and 10 mm thick. The separations between magnets 618 and stator core 602, between magnets 610(4) and 610(5) and between magnets 610(9) and 610(10) are all about 12 mm. And the stroke of the actuator assemblies is about 50 mm.

The arrangement of the magnets is shown in FIG. 12 with all other components removed for purposes of illustration. The four stator magnets 618 in the upper half of the housing have their magnetic moments directed perpendicularly to and toward axis 608 of stator core 602 (i.e., the north pole of the magnet faces stator core 602). The four magnets on the lower half of the housing have their magnetic moments directed perpendicularly to and away from axis 608 of stator core 602. In contrast, magnets 610 within stator core 602 are arranged with their magnetic moments directed parallel to axis 608 of stator core 602. The direction in which they are oriented is different in the different sections of stator core 602. The upper section has four magnets stacked one on top of the other, with the north poles all pointed up along the axis of the stator core. The lower section has four magnets stacked one on top of the other, also with the north poles all pointed up along the axis of the stator core. The middle section of stator core 602 has five magnets arranged one on top of the other with the north poles all pointed down along the axis of the stator core, i.e., in opposition to the magnets of the lower section (and the upper section).

This arrangement of magnets produces three magnetic circuits. The upper magnetic circuit includes the top two magnets on the housing and the four magnets in the upper section of the stator core. The lower magnetic circuit includes the bottom two magnets on the housing and the four magnets in the lower section of the stator core. And the middle magnetic circuit includes the four middle magnets on the housing and the five magnets in the stator core. The upper portion of the housing forms the return path for the magnetic fields in the upper circuit, the middle section of the housing forms the magnetic return path for the magnetic fields in the middle section; and the lower part of the housing forms the return path for the magnetic fields in the lower magnetic circuit. One can readily appreciate the value of having the housing extend continuously from the ends of stator core to the magnets affixed to the housing sidewalls. Providing return paths having high magnetic permeability in this manner enhances the fields within the gap between the magnets mounted on the housing and the stator core. The neighboring magnets with their opposed magnetic moments forces the magnetic field to concentrate near the gaps. So with this particular design, the most intense magnetic fields that are seen by the coils tend to be located in near the gaps formed by the separators, which in the described embodiment is also the midpoint of the coils operating range.

To see how the forces act upon the current carrying coils, consider the upper coil and assume that the current it carries is traveling through the coil as indicated by the convention shown in FIG. 12. That is, on the left side of the stator core, the current is normal to and coming out of the plane of the image which means that on the right side the current is normal to going into the plane of the image. Since the orientation of the magnetic field in the gap is towards the stator core, the force that it produces on the coil winding that is carrying the current is parallel to the stator core and upward. On the other side of the stator core, where the direction of the magnetic field is in the opposite direction (i.e., away from the stator core) and the current in the coil winding is going into the plane of the image, rather than out, the force produced on the coil winding is also parallel to the stator core and in the upward direction. So, with a drive current as described, the coil will be pushed upward along the length of the stator core.

For the lower coil, which experiences a field in the opposite direction to that described above, one can readily see that with currents flowing in the same direction as described above, the force produced on the coil winding is again parallel to the stator core but in the downward direction. Thus, with the currents flowing through the coils as described the two actuator assemblies will be pushed away from each other.

Reversing the current in both coils will result in forces in opposite directions to those described above. And under those circumstances the actuator assemblies will be forced toward each other. By appropriately controlling the current applied to the coils, one can cause the actuators to move towards each other and then away from each other in an oscillatory manner. The cam followers, which are attached to the actuator assemblies, and the cam, which the cam followers ride against, will translate this oscillating back and forth motion into rotary motion.

Figure 9B:
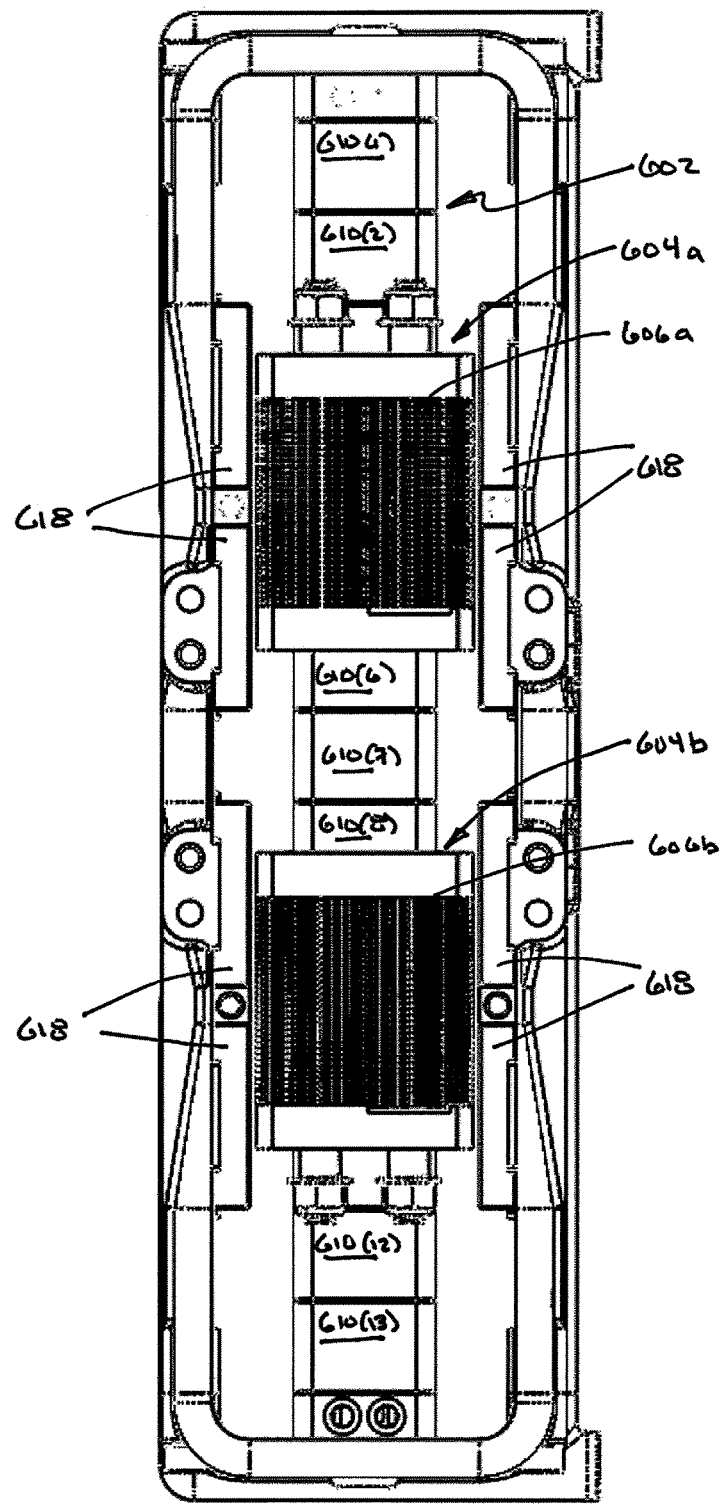
Figure 9C:
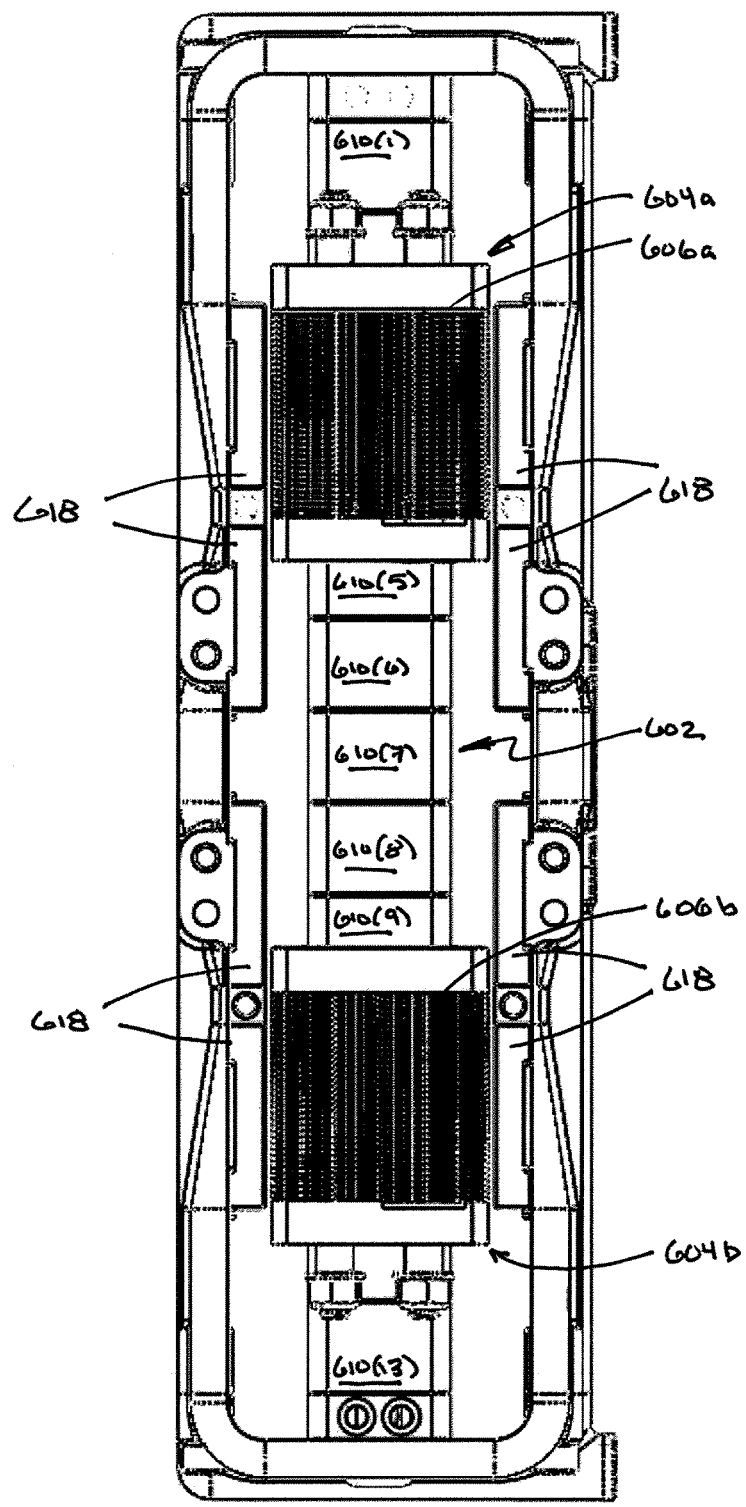

The different positions of the two coils 606a and 606b as they move through a complete cycle of operation are illustrated in FIGS. 9A, 9B and 9C. FIG. 9B shows the midpoint of the operating cycle. At this point, the middle of each coil 606a and 606b is aligned with the separator 626 (not visible) in its half of stator core 602. And the cam followers, which were previously described, are located on the steepest portion of the cam. FIG. 9A shows the bottom of the cycle with the coils 606a and 606b closest to each other. This is the point at which the movement of the coils towards each other has stopped and they are about to begin, under control of the controller which provides the drive current, their movement away from each other. FIG. 9C shows the top of the cycle with the coils 606a and 606b farthest from each other. This is the point at which the movement of the coils towards each other has stopped and they are about to begin, under control of the controller which provides the drive current, their movement towards each other.

It should be noted that there are competing design objectives which apply to the housing. It is desirable to avoid having excess material in the housing which would result in increased weight and increased size of the engine. And it is also desirable that the magnetically permeable material in the return path (i.e., the combination of steel and magnets) be saturated so the coils see an effective permeability that is low compared to that of the housing material itself in the absence of any magnetic fields. Thus, the coils will have a lower effective inductance and thereby require lower voltages to produce comparable drive currents. However, it is also desirable that there be sufficient magnetically permeable material to contain the magnetic field and minimize fringing of the magnetic field outside of the housing.

These competing objectives were pursued in the described embodiment by removing material that was not part of the magnetic return path and by tapering the thickness of the housing where the flux was lower. For example, notice in FIGS. 10A-B that the thickness of the sidewall of the housing tapers in the regions of the sidewall behind the magnets (see regions indicated by reference number 652). Also, note that the end plates have rounded corners so that the flux in that region sees an approximately constant cross-sectional area throughout that region. The design of the corners was guided in part by the natural path that the magnetic fields will take in the housing and material that would tend to be outside the primary path of the magnetic field was removed. To reinforce the strength of the portion of the sidewalls that were made thinner, ribs 650 (or I-beam structure) that end along the outside length of the sidewall were used.

By saturating the housing material that is in the return path, it has been determined that the effective permeability of the circuit as seen by the coil is very close to that of air. As a consequence, the inductance of the coil is much lower and the current that is required to drive the coil is correspondingly less. In other words, the same torques can be achieved by using lower currents, which in turn places lower demands on the drive circuitry and makes possible the use of materials other than copper to fabricate the coils (e.g aluminum). Or alternatively, by making sure that the housing material is saturated by the magnetic field, the torque that is achievable for any give drive current is higher. For the embodiment of FIG. 9, as compared to the embodiment of FIG. 4, the integrated field strength and the force are about 3-4 times greater. In addition, the forces that are achievable in both directions are more comparable since the magnetic field produced by the coils has less impact on the net magnetic field seen by the coil currents (i.e., there is less back EMF.

Figure 13:
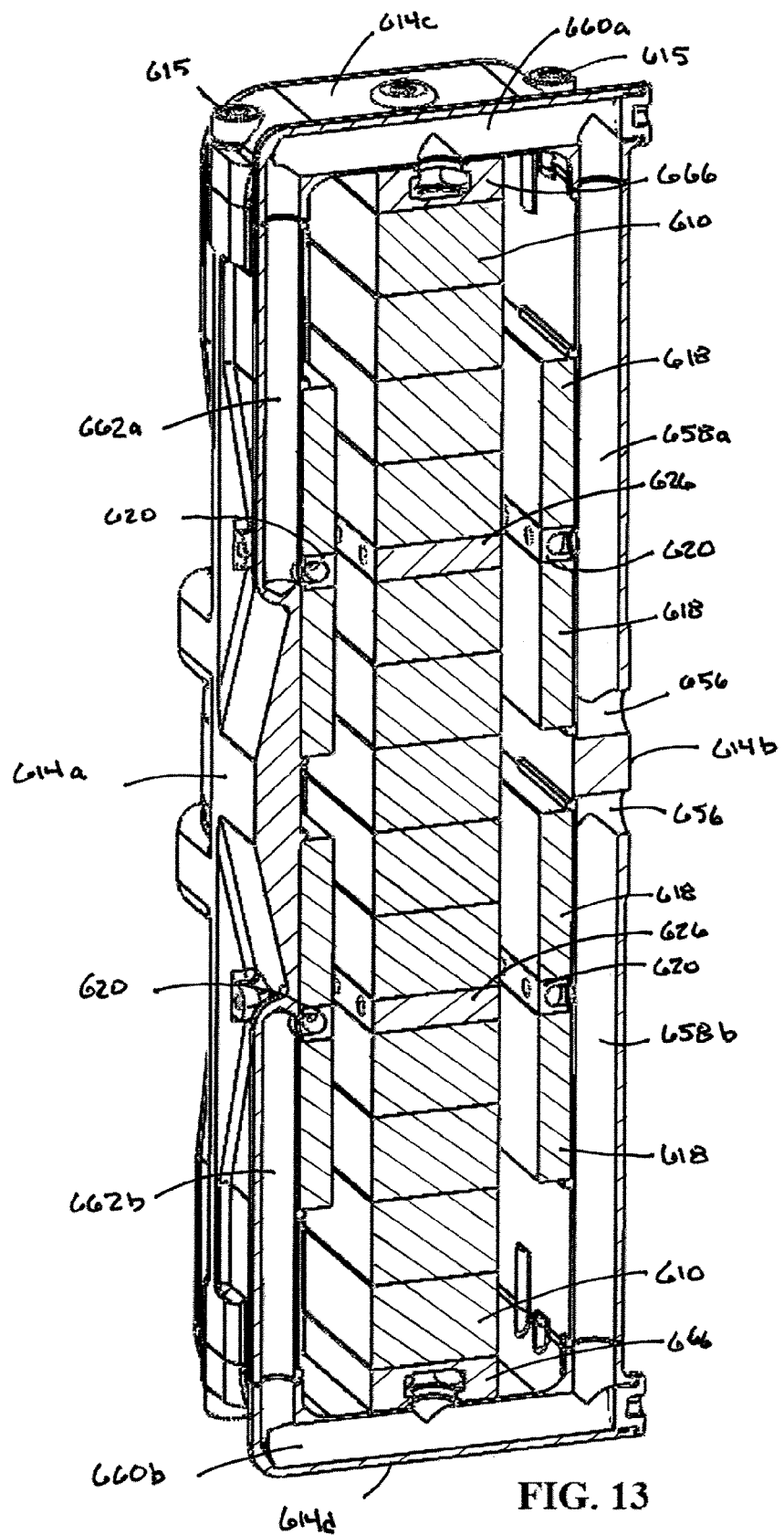
FIG. 13 is a cross-sectional view of the linear Lorentz-type actuator engine exposing the coolant distribution channels.

FIG. 13 shows a cross-sectional view of the housing that exposes the internal channels in the sidewalls that are used to supply coolant to the orifices in the separators between the magnets mounted on the insides of the sidewalls. Input ports 656 for introducing the coolant are provided on the side of one of the sidewalls. These ports 656 connect to channels 658a and 658b that extend within the sidewall up to corresponding channels formed in the end plates 614c and 614d. The channels in the end plates extend across the end plate and connect with corresponding channels 662a and 662b that extend inside the other sidewall 614b to the level where separators 620 are located. At the location of separators 620, there are holes in the sidewalls that connect channels 662a and 662b to plenums in separators 620 and from which coolant is delivered to the orifices for spraying onto the coils.

Figure 14:
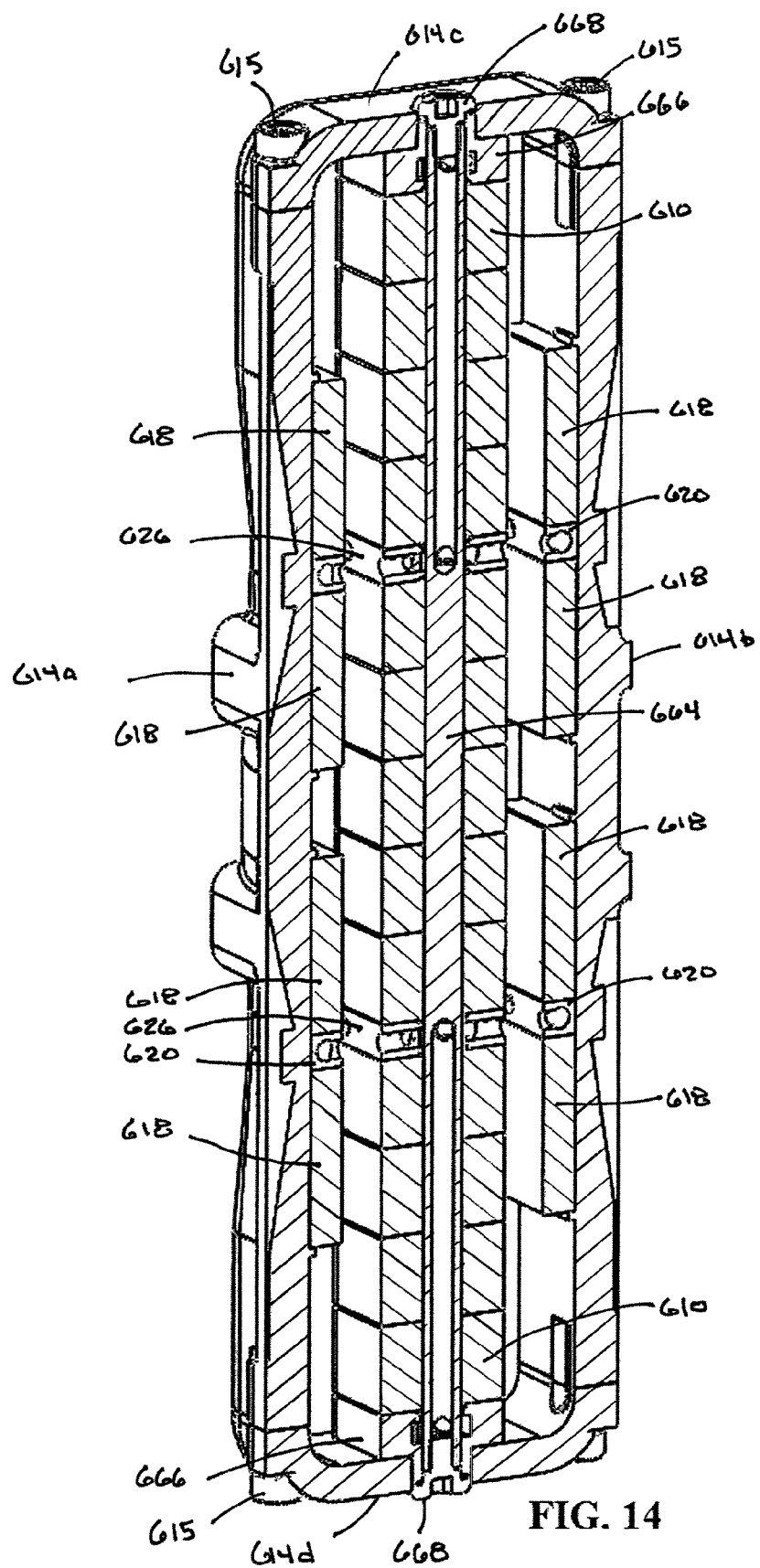
FIG. 14 is a cross-sectional view of the linear Lorentz-type actuator engine exposing the alignment rods.

FIG. 14 shows a cross-sectional view of the stator assembly that exposes one of the two alignment rods 664 which serve to align the stator core magnets with each other, to hold the entire stack of magnets together, and to deliver coolant to separators 626 within stator core 602. Each rod 664 includes a channel 670 extending down into the rod and has an internal thread within the upper part of the channel for receiving a bolt 668. Each rod 664 passes through a corresponding hole in each of the magnets in the stator core. At each end of the stack of magnets making up the stator core, there is an end cap 666 held on the rod by bolt 668. The end caps serve to hold the magnets together on the rod and to provide passageways through which coolant can be pumped into channels 670 within the rods. Each channel 670 extends sufficiently far into the rod to reach the level of separators 626. In the rod near the lower end of each channel 670 there are holes which enable the coolant to flow into small plenum chambers within separators 626 and which connect to orifices through which the coolant is injected towards the coils.

Devices designed in accordance with the principles described above can be engines, generators, or a combination engine/generator.

Other embodiments are within the scope of the following claims. For example, it is also possible to construct the entire housing of permanent magnets instead of a combination of steel and magnets as described above. In one such embodiment, the housing might be made of two hollow magnets formed in the shape of cylinders (i.e., with circular cross-sections) or conduits having rectangular cross-sections. In either case, one magnetic structure would be positioned above the other, both circumscribing the core and with their magnetic moments oriented in opposition to each other. The magnetic moments could be oriented parallel to the core axis (i.e., with the north pole at top end of the container structure and the south pole at bottom end of the container et opposite end) or oriented radially with respect that that axis. Making the entire structure though physically more challenging has the advantage of having no steel or other non-magnetic material in the return paths through which the magnetic field generated by the core magnets must pass.

What is claimed is:

1. An electric device comprising:
an actuator including a coil having an axis; and
a stator assembly comprising:
a stator core arranged along a linear axis, said stator core comprising a first plurality of magnets each characterized by a magnetic moment, said first plurality of magnets arranged in a stack along said linear axis with the magnet moments of the first plurality of magnets being co-linearly aligned parallel to the linear axis, wherein the magnetic moments of the plurality of magnets reverse direction along the linear axis at a boundary between neighboring magnets of said plurality of magnets, and wherein the actuator is arranged on the stator core with the coil of the actuator encircling the linear axis and the first plurality of magnets with the axis of the coil parallel to the linear axis,
said stator core further comprising a second plurality of magnets arranged outside of the coil with the coil positioned between the first plurality of magnets and the second plurality of magnets, said magnets of the second plurality of magnets in positions fixed relative to the first plurality of magnets.

2. The electric device of claim 1, wherein the actuator is positioned on the stator core adjacent to the boundary between a first magnet and a second magnet of the first plurality of magnets.

3. The electric device of claim 1, further comprising an outer enclosure structure having a first wall and a second wall, wherein the stator core and the actuator are between the first and second walls of the outer enclosure structure, and wherein the second plurality of magnets forms at least part of at least one of the first and second sidewalls of the outer enclosure structure.

4. The electric device of claim 3, wherein the magnets of the second plurality of magnets are each characterized by a magnetic moment and wherein the magnetic moments of the second plurality of magnets are oriented substantially perpendicular to the linear axis of the stator core.

5. The electric device of claim 3, wherein the outer enclosure structure comprises a housing made of a material having a magnetic permeability significantly higher than that of air, said housing having a first wall and a second wall and wherein the second plurality of magnets are on at least one of the first and second walls of the housing.

6. The electric device of claim 5 wherein the housing comprises steel.

7. The electric device of claim 5, wherein the second wall of the housing is opposite the first wall of the housing.

8. The electric device of claim 7, wherein the second plurality of magnets are on both the first and second walls of the housing.

9. The electric device of claim 5, wherein the housing further comprises a top wall and a bottom wall, the top wall bridging between a top end of the first sidewall and a top end of the second sidewall, the bottom wall bridging between a bottom end of the first sidewall and a bottom end of the second sidewall.

10. The electric device of claim 9 wherein the first, second, top, and bottom walls of the housing are made of a material having magnetic permeability significantly greater than air.

11. The electric device of claim 9 wherein the first, second, top, and bottom walls of the housing are made of steel.

12. An electric device comprising:
a stator assembly;
a first actuator including a first coil having an axis; and
a second actuator including a second coil having an axis,
wherein the stator assembly comprises:
a stator core arranged along a linear axis, the stator core comprising a plurality of magnets each characterized by a magnetic moment, the plurality of magnets arranged in at least one stack along the linear axis with the magnetic moments of the plurality of magnets being co-linearly aligned parallel to the linear axis, wherein the magnetic moments of the plurality of magnets reverse direction along the linear axis at a first boundary between neighboring magnets of the plurality of magnets and at a second boundary between neighboring magnets of the plurality of magnets, wherein the first actuator is arranged on the stator core with the first coil of the first actuator encircling the linear axis with the axis of the first coil of the first actuator parallel to the linear axis, and wherein said second actuator is arranged on the stator core with the second coil of the second actuator encircling the linear axis with the axis of the second coil of the second actuator parallel to the linear axis.

13. The electric device of claim 12, wherein the first actuator is positioned on the stator core adjacent to the first boundary and the second actuator is positioned on the stator core adjacent to the second boundary.

14. The electric device of claim 1, wherein the first plurality of magnets in the stator core are rare-earth magnets.

15. The electric device of claim 14, wherein the first plurality of magnets in the stator core are neodymium iron boron magnets.

16. The electric device of claim 12, wherein the first and second coils wind around the stator core in the same direction.

17. The electric device of claim 12, further comprising:
a cam assembly including a rotatable cam; and
a plurality of cam followers interfacing with the cam, wherein each of the first and second actuators is coupled to the plurality of cam followers, said cam followers physically arranged to ride on the cam during operation of the electric device so as to convert linear motion of the first and second actuators to rotation of the cam.

18. An electric device comprising:
a stator assembly;
a first actuator including a first coil;
a second actuator including a second coil;
a cam assembly including a rotatable cam; and
a plurality of cam followers interfacing with the cam,
wherein the stator assembly comprises:
a stator core arranged along a linear axis, said stator core comprising a plurality of magnets each characterized by a magnetic moment, said plurality of magnets arranged in a stack along said linear axis with the magnet moments of the plurality of magnets being co-linearly aligned parallel to the linear axis, wherein the magnetic moments of the plurality of magnets reverse direction along the linear axis at a first boundary in the stator core and at a second boundary in the stator core, wherein the first actuator is arranged on the stator core adjacent to the first boundary with the first coil of the first actuator encircling the linear axis with the axis of the first coil parallel to the linear axis, and wherein the second actuator is arranged on the stator core adjacent to the second boundary with the second coil of the second actuator encircling the linear axis with the axis of the second coil parallel to the linear axis, and
wherein each of the first and second actuators is coupled to at least some of the plurality of cam followers, said cam followers physically arranged to ride on the cam during operation of the electric device so as to convert linear motion of the first and second actuators to rotation of the cam.

19. The electric device of claim 18 wherein the stator assembly further comprises:
a housing made of a material having a magnetic permeability significantly higher than air and having a first sidewall and a second sidewall opposite said first sidewall, wherein the stator core along with the first and second actuators are mounted within the housing between the first and second sidewalls; and
a second plurality of magnets arranged on the first and second sidewalls of the housing, the magnets of the second plurality of magnets each characterized by a magnetic moment and wherein the magnets are arranged on the first and second sidewalls of the housing with the magnetic moments of the second plurality of magnets oriented perpendicularly to the linear axis of the stator core.

20. The electric device of claim 1, wherein at the boundary the stator core has a gap separating magnets of the first plurality of magnets.

21. The electric device of claim 12, wherein at the first boundary the stator core has a first gap separating magnets of the plurality of magnets and at the second boundary the stator core has a second gap separating magnets of the plurality of magnets, wherein the magnetic moments of the plurality of magnets reverse direction along the linear axis at the first gap in the stator core and at the second gap in the stator core.

22. The electric device of claim 18, wherein at the first boundary the stator core has a first gap separating magnets of the plurality of magnets and at the second boundary the stator core has a second gap separating magnets of the first plurality of magnets, wherein the magnetic moments of the plurality of magnets reverse direction along the linear axis at the first gap in the stator core and at the second gap in the stator core.

* * * * *